(12) United States Patent
Oguchi

(10) Patent No.: US 8,223,681 B2
(45) Date of Patent: Jul. 17, 2012

(54) BASE STATION, MOBILE STATION, AND METHOD FOR WIDEBAND WIRELESS ACCESS SYSTEM

(75) Inventor: Naoki Oguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 407 days.

(21) Appl. No.: 12/492,970

(22) Filed: Jun. 26, 2009

(65) Prior Publication Data

US 2010/0002665 A1 Jan. 7, 2010

(30) Foreign Application Priority Data

Jul. 3, 2008 (JP) .................................. 2008-174851

(51) Int. Cl.
*G08C 17/00* (2006.01)
(52) U.S. Cl. ......................... 370/311; 455/69; 455/574
(58) Field of Classification Search .................. 370/311; 455/69, 574

See application file for complete search history.

(56) References Cited

U.S. PATENT DOCUMENTS

| | | | |
|---|---|---|---|
| 5,507,039 A | 4/1996 | Honma | |
| 5,566,081 A | 10/1996 | Yoshizawa et al. | |
| 5,778,311 A | 7/1998 | Nakanishi | |
| 6,006,101 A | 12/1999 | Sakamoto | |
| 2003/0117968 A1 | 6/2003 | Motegi et al. | |
| 2004/0218556 A1* | 11/2004 | Son et al. | 370/311 |
| 2005/0054389 A1* | 3/2005 | Lee et al. | 455/574 |
| 2005/0163088 A1 | 7/2005 | Yamano et al. | |
| 2008/0175180 A1* | 7/2008 | Kim | 370/311 |
| 2009/0232081 A1* | 9/2009 | Son et al. | 370/329 |
| 2010/0062725 A1* | 3/2010 | Ryu et al. | 455/69 |
| 2010/0113054 A1* | 5/2010 | Iwamura et al. | 455/452.1 |
| 2011/0002253 A1* | 1/2011 | Cha et al. | 370/311 |

FOREIGN PATENT DOCUMENTS

| | | |
|---|---|---|
| JP | 4-334215 A | 11/1992 |
| JP | 5-56119 A | 3/1993 |
| JP | 5-327586 A | 12/1993 |
| JP | 5-344044 A | 12/1993 |
| JP | 6-53881 A | 2/1994 |
| JP | 6-140984 A | 5/1994 |
| JP | 6-141365 A | 5/1994 |
| JP | 8-70488 | 3/1996 |
| JP | 9-18367 A | 1/1997 |
| JP | 9-83427 A | 3/1997 |

(Continued)

OTHER PUBLICATIONS

"IEEE Standard for Local and Metropolitan Area Networks." Part 16: Air Interface for Fixed and Mobile Broadband Wireless Access Systems, Amendment 2: Physical and Medium Access Control Layers for Combined Fixed and Mobile Operation in Licensed Bands. Feb. 28, 2006.

*Primary Examiner* — Albert T Chou
(74) *Attorney, Agent, or Firm* — Fujitsu Patent Center

(57) ABSTRACT

A base station includes a deciding part configured to decide a period of performing data transmission/reception and a period of not performing data transmission/reception when performing intermittent communications, a generating part configured to generate a predetermined signal to a mobile station, and an adjusting part configured to adjust the period of performing data transmission/reception and/or the period of not performing data transmission/reception according to a response signal transmitted from the mobile station in response to the predetermined signal.

13 Claims, 15 Drawing Sheets

FOREIGN PATENT DOCUMENTS

| | | |
|---|---|---|
| JP | 10-135893 A | 5/1998 |
| JP | 10-242926 | 9/1998 |
| JP | 2000-69523 A | 3/2000 |
| JP | 2003-134026 A | 5/2003 |
| JP | 2003-179539 A | 6/2003 |
| JP | 2005-217548 A | 8/2005 |
| JP | 2005-260906 A | 9/2005 |
| JP | 2007-53628 A | 3/2007 |

* cited by examiner

| FIELD | SIZE (bit) | VALUE (EXAMPLE) |
|---|---|---|
| Management Message Type | 8 | 50 |
| Number of Classes | 8 | 0x1 |
| for (i = 0; i < Number of Classes; i++) { | | |
| Definition | 1 | 0b1 |
| Operation | 1 | 0b1 |
| Power_Saving_Class_ID | 6 | 0x1 |
| Start Frame Number | 7 | 0x85 |
| Power Saving Class Type | 3 | 0b100=Type IV |
| Direction | 2 | 0b00 |
| TRF-IND_required | 1 | 0 |
| Traffic Triggered Waking Flag | 1 | 0 |
| Initial Sleep window | 8 | 0x190(400frame=2sec) |
| Listening window | 8 | 0x64(100frame=0.5sec) |
| Final sleep window base | 10 | 0 |
| Final sleep window exponent | 3 | 0 |
| Unstable unavailable listening window | 8 | 0x32(50frame=0.25sec) |
| Unstable unavailable sleep window | 10 | 0x64(100frame=0.5sec) |
| Unstable available listening window | 8 | 0xC8(200frame=1sec) |
| Unstable available sleep window | 10 | 0x12c(300frame=1.5sec) |
| Number of CIDs | 3 | 0x2 |
| CID#0 | 16 | 0x5 |
| CID#1 | 16 | 0x6 |
| } | | |

| MS | PSC ID | REGULAR COMMUNICATION | | RADIO WAVE UNSTABLE, COMMUNICATION POSSIBLE | | | | RADIO WAVE UNSTABLE, COMMUNICATION IMPOSSIBLE | |
|---|---|---|---|---|---|---|---|---|---|
| | | Listening window ⟨Ta0⟩ | Sleep window ⟨Tu0⟩ | TRAFFIC EXIST Listening window ⟨Ta2⟩ | NO TRAFFIC Listening window ⟨Ta21⟩ | TRAFFIC EXIST Sleep window ⟨Tu2⟩ | NO TRAFFIC Sleep window ⟨Tu21⟩ | Listening window ⟨Ta1⟩ | Sleep window ⟨Tu1⟩ |
| MS#1 | 0x1 | 0.5sec | 2sec | 1sec | 0.5sec | 1.5sec | 2sec | 0.25sec | 0.5sec |

FIG.10

| FIELD | SIZE (bit) | VALUE |
|---|---|---|
| Management Message Type | 8 | 51 |
| Number of Classes | 8 | 0x1 |
| for (i = 0; i < Number of Classes; i++) { | | |
| Length of Data | 7 | |
| Sleep Approved | 1 | 0b1 |
| Definition | 1 | 0b1 |
| Operation | 1 | 0b1 |
| Power_Saving_Class_ID | 6 | 0x1 |
| Start Frame Number | 7 | 0x85 |
| Power Saving Class Type | 3 | 0b100=Type IV |
| Direction | 2 | 0b00 |
| TRF-IND_required | 1 | 0 |
| Traffic Triggered Waking Flag | 1 | 0 |
| Initial Sleep window | 8 | 0x190(400frame=2sec) |
| Listening window | 8 | 0x64(100frame=0.5sec) |
| Final sleep window | 10 | 0 |
| Final sleep window exponent | 3 | 0 |
| Unstable portion listening window | 8 | 0x32(50frame=0.25sec) |
| Unstable portion sleep window | 10 | 0x64(100frame=0.5sec) |
| Stable portion listening window | 8 | 0xC8(200frame=1sec) |
| Stable portion sleep window | 10 | 0x12c(300frame=1.5sec) |
| Number of CIDs | 3 | 0x2 |
| CID#0 | 16 | 0x5 |
| CID#1 | 16 | 0x6 |
| Frame Offset | 8 | 0x4 |
| OFDMA symbol offset | 8 | |
| Subchannel offset | 7 | |
| No. OFDMA symbols | 7 | |
| No. subchannels | 3 | |
| } | | |

FIG.11

| FIELD | SIZE | VALUE |
|---|---|---|
| Management Message Type | 8 | 52 |
| FMT | 1 | SELECTIVE |
| if (FMT == 0) { | | |
| SLPID-Group Indication Bitmap | 32 | VARIABLE |
| Traffic Indication Bitmap | VARIABLE | VARIABLE |
| }else{ | | |
| Num_pos | | VARIABLE |
| SLPIDs | 10 | VARIABLE |
| } | | |
| Num_dynamic_PSC | | 0x1 |
| for (i = 0; i < Num_dynamic_PSC; i++) { | | |
| SLPIDs | | 0x1 |
| Next traffic prediction | | 1 YES  0 NO |
| } | | |

FIG.12

| CODE | MEANING |
|---|---|
| 0b0000 | NO FEEDBACK |
| 0b0010 | UL NO TRAFFIC |
| 0b0011 | UL TRAFFIC |

BASE STATION, MOBILE STATION, AND METHOD FOR WIDEBAND WIRELESS ACCESS SYSTEM

CROSS-REFERENCE TO RELATED APPLICATIONS

This application is based upon and claims the benefit of priority of the prior Japanese Patent Application No. 2008-174851 filed on Jul. 3, 2008, the entire contents of which are incorporated herein by reference.

FIELD

The embodiments discussed herein are related to a wideband wireless access system. For example, a base station, a mobile station, and a method used for the wideband wireless access system.

BACKGROUND

Description of the Related Art

A mobile station has a limited battery capacity. Therefore, it is desired for a mobile station to reduce consumption of power while maintaining connection with a base station. The mobile station includes, for example, a mobile phone or a portable information terminal (e.g., PDA: Personal Digital Assistant).

In response to such desire, WiMAX (Worldwide Interoperability for Microwave Access) described in IEEE 802.16e-2005 introduces, for example, an operation mode referred to as a Sleep mode. With the sleep mode, there is a period of performing transmission/reception of data (Listening window) and a period of not performing transmission/reception of data (Sleep window) while maintaining a logically connected state between a mobile station (MS) and a base station (BS).

The mobile station and the base station negotiate the period of performing transmission/reception of data and the period of not performing transmission/reception of data. By the negotiation, the mobile station does not need to transmit/receive radio waves during the Sleep window. Accordingly, the mobile station may temporarily turn off the power of an unused circuit or temporarily turn off its clock. Thereby, consumption of power can be reduced.

The process of the Sleep mode is described in detail with reference to FIG. 1.

In FIG. 1, a mobile station (MS) transmits a sleep request message (MOB_SLP-REQ) to a base station (BS) for requesting a Power Saving Class (PSC) indicating a group of connections having the same intermittent communication schedules as the mobile station (Step S102).

The BS transmits a sleep response message (MOB_SLP-RSP) together with parameters designating the size of the Sleep window and the Listening window (Step S104).

The MS calculates the Sleep window and the Listening window according to the received parameters.

In FIG. 1, "SleepWin" indicates the time of the sleep window, "prevSleepWin" indicates a previous sleep window, "finalSlpWinBase" indicates a value that is finally assigned as a sleep interval, "finalSlpWinExp" is the exponent of 2 where $2^{\wedge}$ finalslpWinExp is multiplied with the "finalSleepWinBase" for calculating the final sleep window. For example, the final sleep window is represented with the following formula.

final-sleep window=final-sleep window base×2^(final-sleep window exponent).

Three types of behavior of intermittent communications are prepared according to situations such as a case where there is no communication traffic or a case where intermittent transmission is performed for saving power even though there is communications traffic.

The behavior of the Sleep mode is referred to as a power saving class (PSC). The power saving class includes the method of the schedule of the Listening window and the Sleep window for intermittent communications, and conditions for ending the intermittent communications.

The power saving class may be mapped to a connection ID between the MS and the BS.

The PSC type 1 is an intermittent communications type optimum for best effort communications of a WEB application. In the best effort type communications, real time communications are not required. The PSC type 1 has a schedule having a Sleep window for intermittent communications that grows larger. Further, the PSC type 1 can cancel the Sleep mode together with the generation of traffic.

The PSC type 2 is an intermittent communications type suited for applications in which real time communications are required and data flows constantly. In the PSC type 2, the Sleep window and the Listening window are fixed. The PSC type 2 is used in situations where constant data communications are desired but at the same time reduction of power consumption of terminals is desired.

The PSC type 3 is a schedule that automatically cancels the Sleep mode at the end of the Sleep window corresponding to a predetermined time intervals. The PSC type 3 is used for transmitting/receiving, for example, control data flowing between the MS, BS at predetermined intervals.

In a case where a MS in a sleep mode is under poor radio wave reception conditions, there is a possibility that the Listening window anticipated by the BS may overlap with a time when the MS cannot receive radio waves.

The time when the MS cannot receive radio waves includes a time when the MS cannot synchronize with the BS. For example, this may apply to a case where the MS is located in-between buildings. For example, as illustrated in FIG. 2, the time of the Listening window of the BS may overlap with the time when the MS cannot receive radio waves. By the negotiation between the BS and the MS, the Listening window and the Sleep window are determined. The BS and the MS can communicate with each other during a period of the Listening window. However, the radio wave reception conditions of the MS may change. For example, in a case of unsatisfactory radio wave reception conditions, the MS and the BS may be unable to synchronize and communicate with each other. Therefore, the Listening window of the BS may overlap with the period in which the MS cannot synchronize with the Listening window.

Under such circumstance where the MS is in unsatisfactory radio wave reception conditions, the period in which the MS and the BS can communicate is an AND period between a communication-able period of the MS and a communication-able period of the BS. The amount of time in which data can be transmitted/received decreases in this AND period. In other words, the period in which the MS and the BS can communicate is a period where a synchronizable period of the MS and a listening window of the BS overlap. Therefore, data can be transmitted/received for a considerably short time.

In a case where the data from an upper layer becomes an amount that cannot be stored by a buffer of the BS, the data from the upper layer may be discarded. Further, a keep alive signal is transmitted between the MS and the BS. In a case where the transmission of the keep alive signal fails repeatedly, the logical connection between the MS and the BS is disconnected. In the case where the logical connection between the MS and the BS is disconnected, the MS cancels the Sleep mode, hands over (HO) the connection to a neighboring BS, and redefines the Sleep mode if necessary. In this case, the period in which data communications cannot be performed between the MS and the BS becomes long. Further, control traffic transmitted/received between the MS and the BS increases.

SUMMARY

According to an aspect of the invention, there is provided a base station including a deciding part configured to decide a period of performing data transmission/reception and a period of not performing data transmission/reception when performing intermittent communications, a generating part configured to generate a predetermined signal to a mobile station, and an adjusting part configured to adjust the period of performing data transmission/reception and/or the period of not performing data transmission/reception according to a response signal transmitted from the mobile station in response to the predetermined signal.

The object and advantages of the invention will be realized and attained by means of the elements and combinations particularly pointed out in the claims.

It is to be understood that both the foregoing generation description and the followed detailed description are exemplary and explanatory and are not restrictive of the invention, as claimed.

BRIEF DESCRIPTION OF DRAWINGS

FIG. 8 is a table for describing a sleep request message according to an embodiment of the present invention;

FIG. 9 is a table for describing a cycle of intermittent communication by a communication system according to an embodiment of the present invention;

FIG. 10 is a table for describing a sleep request response according to an embodiment of the present invention;

FIG. 11 is a table for describing a feedback message according to an embodiment of the present invention;

FIG. 12 is a table for describing a feedback response according to an embodiment of the present invention;

DESCRIPTION OF EMBODIMENTS

Figure 1:
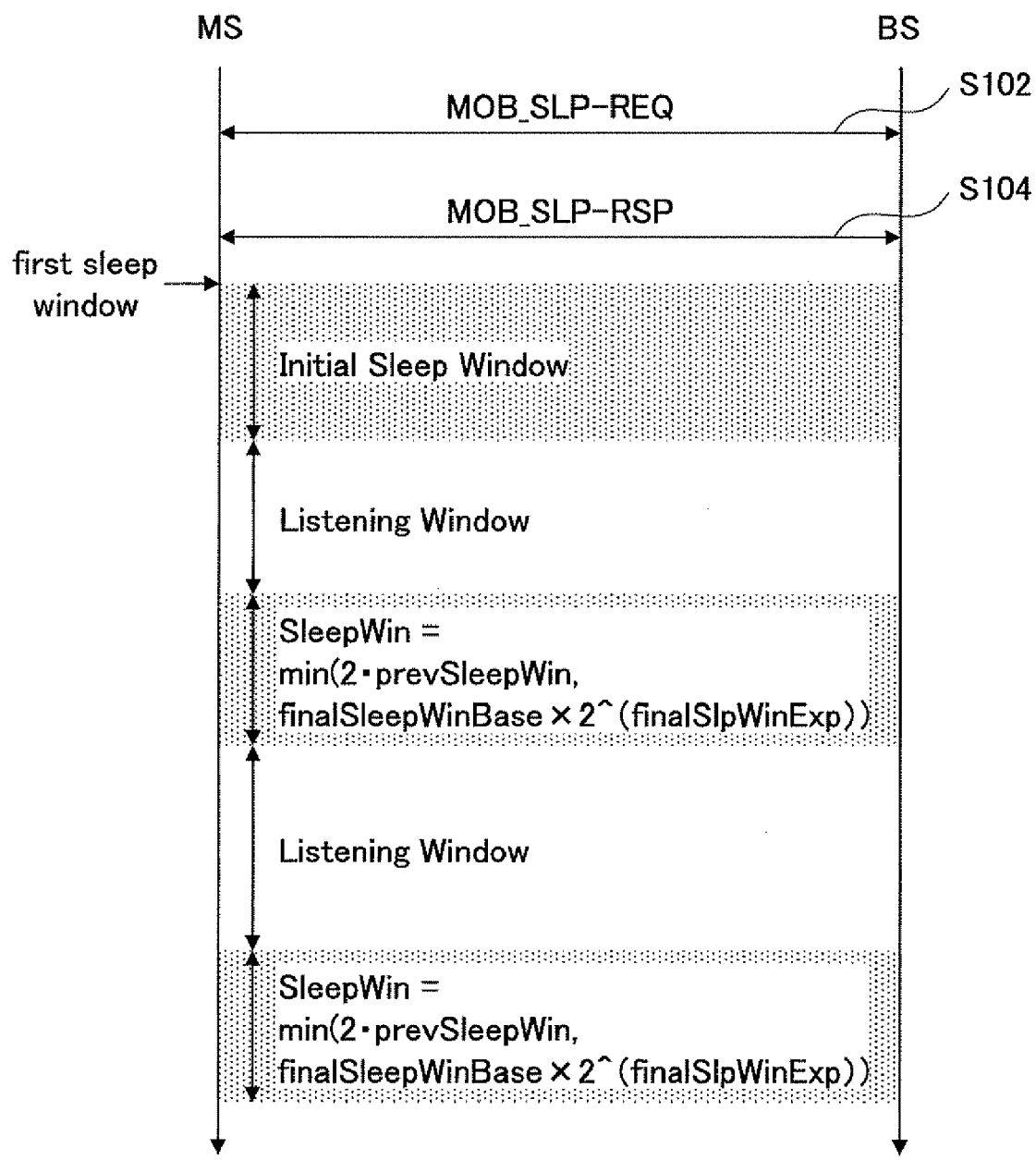
FIG. 1 is a schematic diagram for describing a flow of an operation by a base station and a mobile station for power saving class 1.
Figure 2:
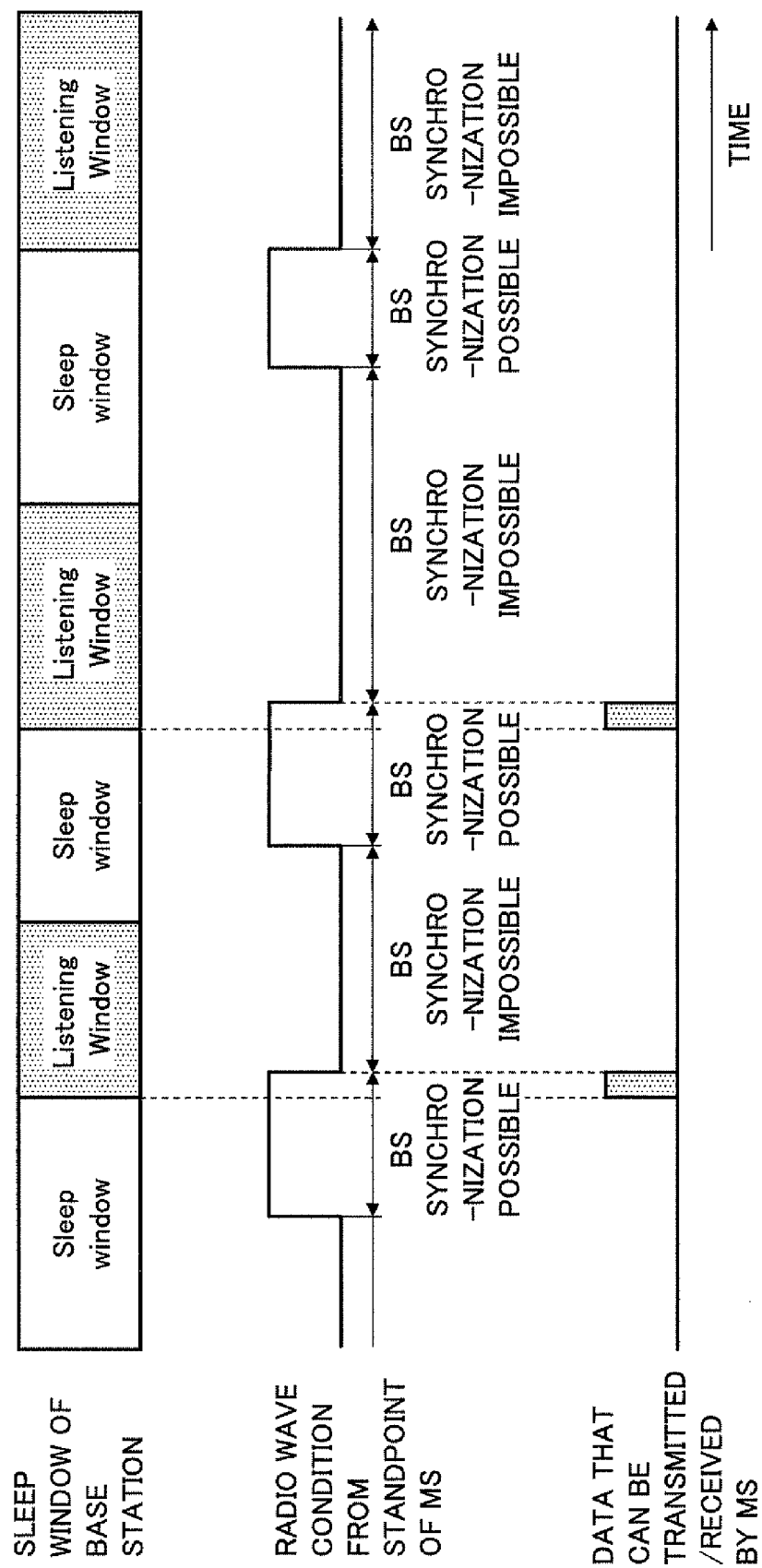
FIG. 2 is a schematic diagram for describing intermittent communication.

In this embodiment, a communications system includes a wireless communications apparatus. The wireless communications apparatus may include a mobile station (MS). The wireless communications apparatus may also include a base station (BS).

In this embodiment, the base station dynamically changes an intermittent cycle according to a radio wave reception condition of the base station from a standpoint of the mobile station. Furthermore, the base station dynamically changes the intermittent cycle depending on traffic (hereinafter referred to as "dynamic cycle mode"). In this embodiment, "intermittent cycle" is a period combining a period of transmitting/receiving data and a period of not transmitting/receiving data while maintaining a logically connected state between the MS and the BS in a case of performing intermittent communication. The period of transmitting/receiving data may be referred to as a Listening window. The period of not transmitting/receiving data may be referred to as a Sleep window. The period of transmitting/receiving data and/or the period of not transmitting/receiving data may be changed. Further, the period combining the period of transmitting/receiving data and the period of not transmitting/receiving data (so-called "cycle") may be changed. Further, both the cycle and the period of transmitting/receiving data, and/or the period of not transmitting/receiving data may be changed.

For example, the following processes are performed.

The mobile station 100 and the base station 200 that perform intermittent communications exchange feedback signals with each other during a communication period of the intermittent cycle. The feedback signals may include information indicating whether standby traffic will occur in the next communication period.

In a case where the mobile station 100 determines that communication with the base station cannot be established, the mobile station 100 stops transmitting feedback signals indicating the radio wave reception status of the mobile station 100. Alternatively, in this case, the mobile station 100 and the base station 200 may switch to a dynamic cycle mode negotiated beforehand.

Further, in a case where there is traffic for a base station, the mobile station 100 changes the cycle so that the period in which feedback from the base station 200 can be received (communication-able period of intermittent cycle) becomes longer than the communication-able period of a previous intermittent cycle. In this case, the mobile station 100 reports to the base station 200 that there is standby traffic destined to the base station 200. For example, the mobile station 100 may report the standby traffic by using a control channel. The mobile station 100 may determine whether traffic will occur based on information of previously transmitted/received feedback signals indicating whether standby traffic will occur.

In a case where there are no feedback signals indicating occurrence of standby traffic from the mobile station 100, the base station 200 changes the cycle of intermittent operations of the base station 200 itself depending on whether there is standby traffic of the base station 200 itself or the mobile station 100. For example, the base station 200 may change the cycle of intermittent operations by shortening the cycle of intermittent operations during a period where no feedback signals indicating occurrence of standby traffic are received depending on whether there has been previous standby traffic of the base station 200 or previous standby traffic of the mobile station 100.

Further, the mobile station 100 may determine that communications between the base station 200 cannot be established when no feedback signals are received from the base station 200.

Alternatively, the mobile station 100 may determine that communications with the base station 200 cannot be established according to the radio waves measured from the base station 200.

Further, when a transmission buffer becomes unoccupied, the mobile station 100 and the base station 200 may end the dynamic cycle mode and return to the regular cycle. For example, in a case where transmission of the data stored in the transmission buffers included in the mobile station 100 and the base station 200 is completed, the mobile station 100 and the base station 200 may end the dynamic cycle mode. Then, the mobile station 100 and the base station 200 may perform communications according to the regular intermittent cycle.

Figure 3:
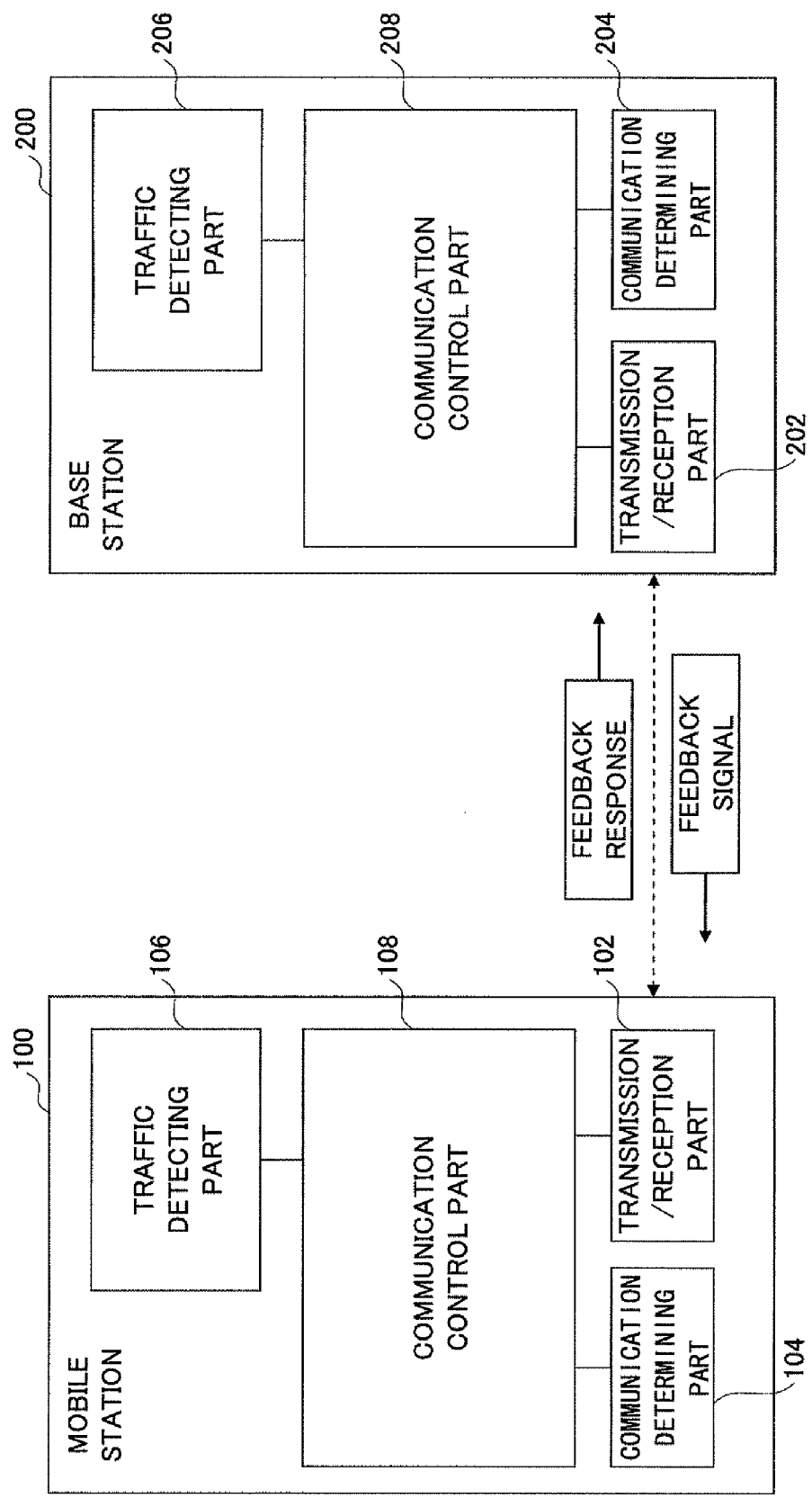
FIG. 3 is a block diagram illustrating a base station and a mobile station according to an embodiment of the present invention.

The mobile station 100 according to an embodiment of the present invention is described with reference to FIG. 3.

The mobile station 100 according to an embodiment of the present invention includes a transmission/reception part 102. The transmission/reception part 102 receives feedback signals transmitted from the base station 200 during the period of performing data reception/transmission in the intermittent cycle. The feedback signals may include information indicating whether traffic exists in the next period of performing data reception/transmission.

The mobile station 100 according to an embodiment of the present invention includes a communication determining part 104. The communication determining part 104 determines whether the mobile station 100 can communicate (communication-able/communications-not able) with the base station 200. In a case where the communication determining part 104 determines that the mobile station 100 cannot communicate with the base station 200, the communication determining part 104 reports to the below-described communication control part 108 that the mobile station 100 cannot communicate with the base station 200.

The mobile station 100 according to an embodiment of the present invention also includes a traffic detecting part 106. The traffic detecting part 106 detects traffic. The traffic detecting part 106 inputs information indicating existence of traffic to the communication control part 108.

Further, the mobile station 100 according to an embodiment of the present invention includes the communication control part 108. In a case where the communication determining part 104 determines that the mobile station 100 cannot communicate with the base station 200, the communication control part 108 performs control for stopping the feedback to the base station 200. Further, in a case where the communication determining part 104 determines that the mobile station 100 cannot communicate and detects traffic in the communications-not able period, the communication control part 108 changes the communications-able period in the intermittent cycle by extending the communications-able period in the intermittent cycle.

Further, the communication control part 108 may change a previous cycle of the intermittent operation where feedback signals are not transmitted by shortening the previous cycle of the intermittent operation according to traffic of the base station 200. Further, the communication control part 108 may change the cycle of the intermittent operation where feedback signals are not transmitted by shortening the cycle of the intermittent operation according to existence of traffic in the mobile station 100.

Further, the communication determining part 104 may determine that the mobile station 100 cannot communicate with the base station 200 where the mobile station 100 cannot receive feedback signals from the base station 200. Further, the communication determining part 104 may determine that the mobile station 100 cannot communicate with the base station 200 depending on the strength of the radio waves received from the base station 200.

Further, in a case where traffic has been eliminated as a result of communicating by changing the intermittent cycle, the communication control part 108 may end the dynamic cycle mode and return to the original intermittent cycle.

The base station 200 according to an embodiment of the present invention is described with reference to FIG. 3.

The base station 200 according to an embodiment of the present invention includes a transmission/reception part 202. The transmission/reception part 202 receives feedback signals (feedback responses) transmitted from the mobile station 100 during the period of performing data reception/transmission in the intermittent cycle. The feedback signals may include information indicating whether traffic exists in the next period of performing data reception/transmission.

The base station 200 also includes a communication determining part 204. The communication determining part 204 determines whether the base station 200 can communicate with the mobile station 100. In a case where the communication determining part 204 determines that the base station 200 cannot communicate with the mobile station 100, the communication determining part 204 reports to the below-described communication control part 208 that the base station 200 cannot communicate with the mobile station 100.

The base station 200 according to an embodiment of the present invention also includes a traffic detecting part 206. The traffic detecting part 206 detects traffic destined to the mobile station 100. The traffic detecting part 206 inputs information indicating existence of traffic to the communication control part 208.

Further, the base station 200 according to an embodiment of the present invention includes the communication control part 208. In a case where the existence of traffic is reported from the traffic detecting part 206, the communication control part 208 changes a feedback signal transmitting period (period of receiving a feedback response from the mobile station 100) in the communications-able period in the intermittent cycle by extending the communications-able period in the intermittent cycle. Further, the communication control part 208 may change a previous cycle of the intermittent operation where feedback signals are not transmitted by shortening the previous cycle of the intermittent operation according to standby traffic of the base station 200. Further, the communication control part 208 may change the cycle of the intermittent operation where feedback signals are not transmitted by shortening the cycle of the intermittent operation according to the standby traffic of the mobile station 100.

Further, the communication determining part 204 may determine that the base station 200 cannot communicate with the mobile station 100 where the base station 200 cannot receive feedback signals from the mobile station 100.

Further, the communication determining part 204 may determine that the base station 200 cannot communicate with the mobile station 100 depending on the strength of the radio waves received from the mobile station 100.

Further, in a case where traffic has been eliminated as a result of communicating by changing the intermittent cycle, the communication control part 208 may end the dynamic cycle mode and return back to the original intermittent cycle.

(Configuration of Communication System)

A communication system according to an embodiment of the present invention is described with reference to FIG. 4.

In the communication system 1000, the mobile station 100 and the base station 200 negotiate a period(s) for performing data reception/transmission and a period(s) for not performing data reception/transmission while maintaining a logical connection. A communication system that performs communications under this condition includes, for example, WiMAX (Worldwide Interoperability for Microwave Access). Thus, in the following, WiMAX is used to describe the communication system 1000 according to an embodiment of the present invention. The communication system according to an embodiment of the present invention may be applied to other communication systems besides WiMAX as long as communications are performed under the above-described condition. With WiMAX, the base station 200 and the mobile station 100 may communicate based on, for example, IEEE 802.16e-2005 or its succeeding standards. With WiMAX, the period for performing transmission/reception of data may be referred to as a "listening window", and the period for not performing transmission/reception of data may be referred to as a "sleep window". With WiMAX, the mode in which such operations between the mobile station 100 and the base station 200 may be referred to as a "sleep mode".

With WiMAX, a TDD (Time Division Duplex) method is used. With the TDD method, full duplex communications are performed by transmitting uplink signals and downlink signals with the same frequency bandwidth and switching uplink and downlink at high speed. The transmission frame of the TDD method includes a downlink subframe for transmitting downlink signals and an uplink subframe for transmitting uplink signals. Further, OFDM (Orthogonal Frequency Division Multiplexing) and OFDMA (Orthogonal Frequency Division Multiple Access) are applied to the communication system 1000 according to an embodiment of the present invention.

The communication system 1000 according to an embodiment of the present invention includes the base station 200. Further, the communication system 1000 according to an embodiment of the present invention includes the mobile station 100. The base station 200 and the mobile station 100 perform wireless communications with the TDD method. The transmission frame of the TDD method includes a downlink subframe (DL Subframe) and an uplink subframe (UL Subframe). A single frame is composed of a pair of the downlink subframe and the uplink subframe. The downlink subframe includes a preamble (Preamble), a frame control header (FCH: Frame Control Header), a DL-MAP, a UL-MAP, and a downlink burst (DL burst). The downlink burst may be classified (divided) into plural regions. The uplink subframe includes a ranging region and an uplink burst (UL burst). The uplink burst may be classified (divided) into plural regions.

The mobile station 100 transmits an initial ranging code by using a ranging region assigned beforehand in the downlink subframe. The initial ranging code may be referred to as a ranging request (RNG-REQ: Ranging Request).

Figure 4:
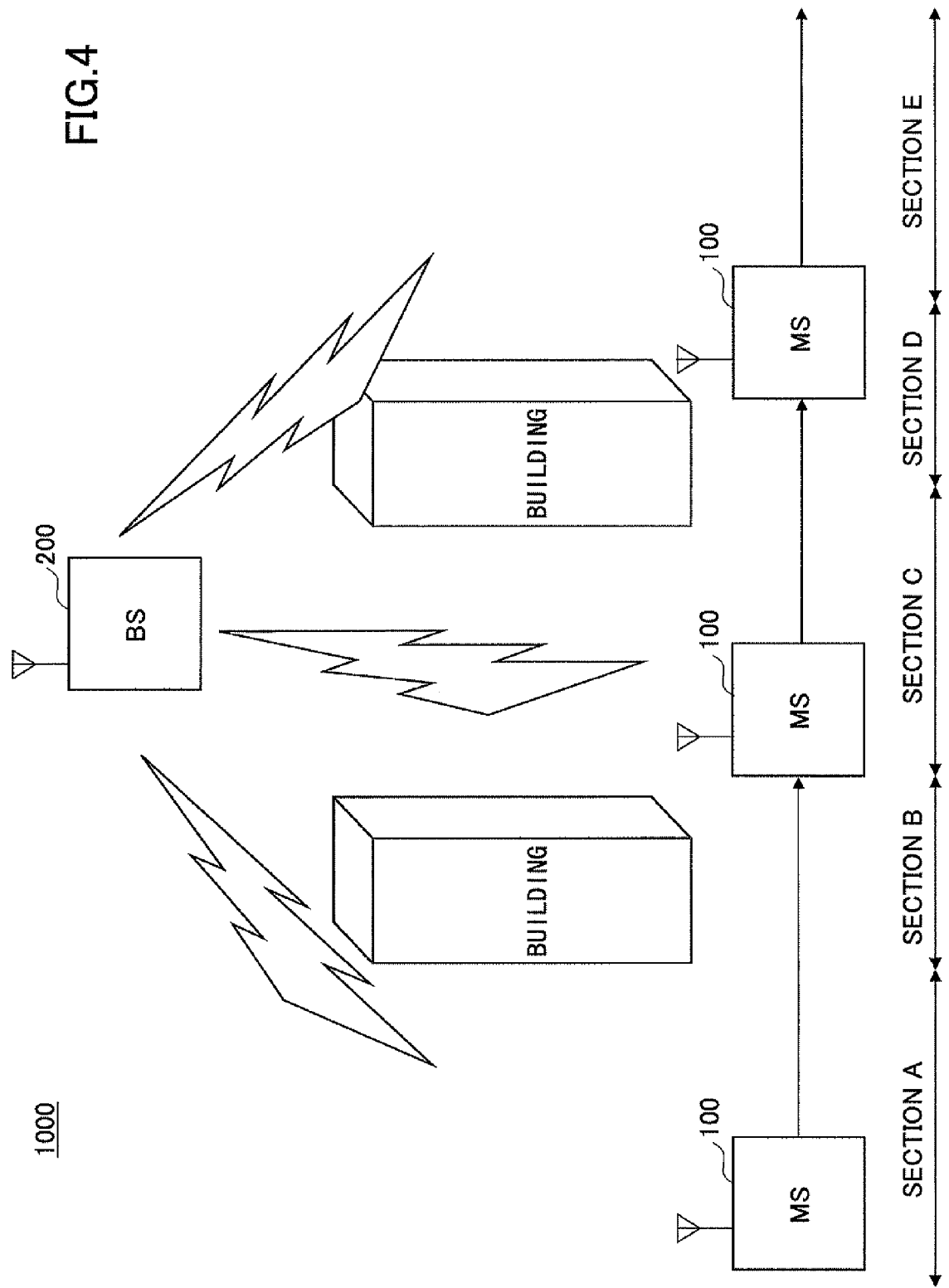
FIG. 4 is a schematic diagram for describing a communication system according to an embodiment of the present invention.

Although a single mobile station 100 is illustrated in FIG. 4, there may be plural mobile stations 100. Further, although a single base station 200 is illustrated in FIG. 4, there may be plural base stations 200.

The mobile station 100 according to an embodiment of the present invention communicates with the base station 200 using an operation mode referred to as "sleep mode". In this embodiment, an example where the mobile station 100 passes through a group of buildings is used to describe a case where radio wave reception conditions between the base station 200 and the mobile station 100 change. The below-described method according to an embodiment of the present invention may be applied to other cases where radio wave reception conditions between the base station 200 and the mobile station 100 change.

In a case where the mobile station 100 becomes hidden behind a building from the standpoint of the base station 200, radio waves from the base station 200 may not reach the mobile station 100.

In FIG. 4, the mobile station 100 moves from the left side to the right side of the drawing. In a case where the mobile station 100 is located in section A, C, or E of FIG. 4, radio waves from the base station 200 can reach the mobile station 100. Accordingly, communications between the mobile station 100 and the base station 200 can be performed. In a case where the mobile station 100 is located in section B or D, the mobile station 100 is hidden behind a building from the standpoint of the base station 200. Accordingly, radio waves from the base station 200 may not be able to reach the mobile station 100. Thus, communications might not be performed between the mobile station 100 and the base station 200.

Figure 5:
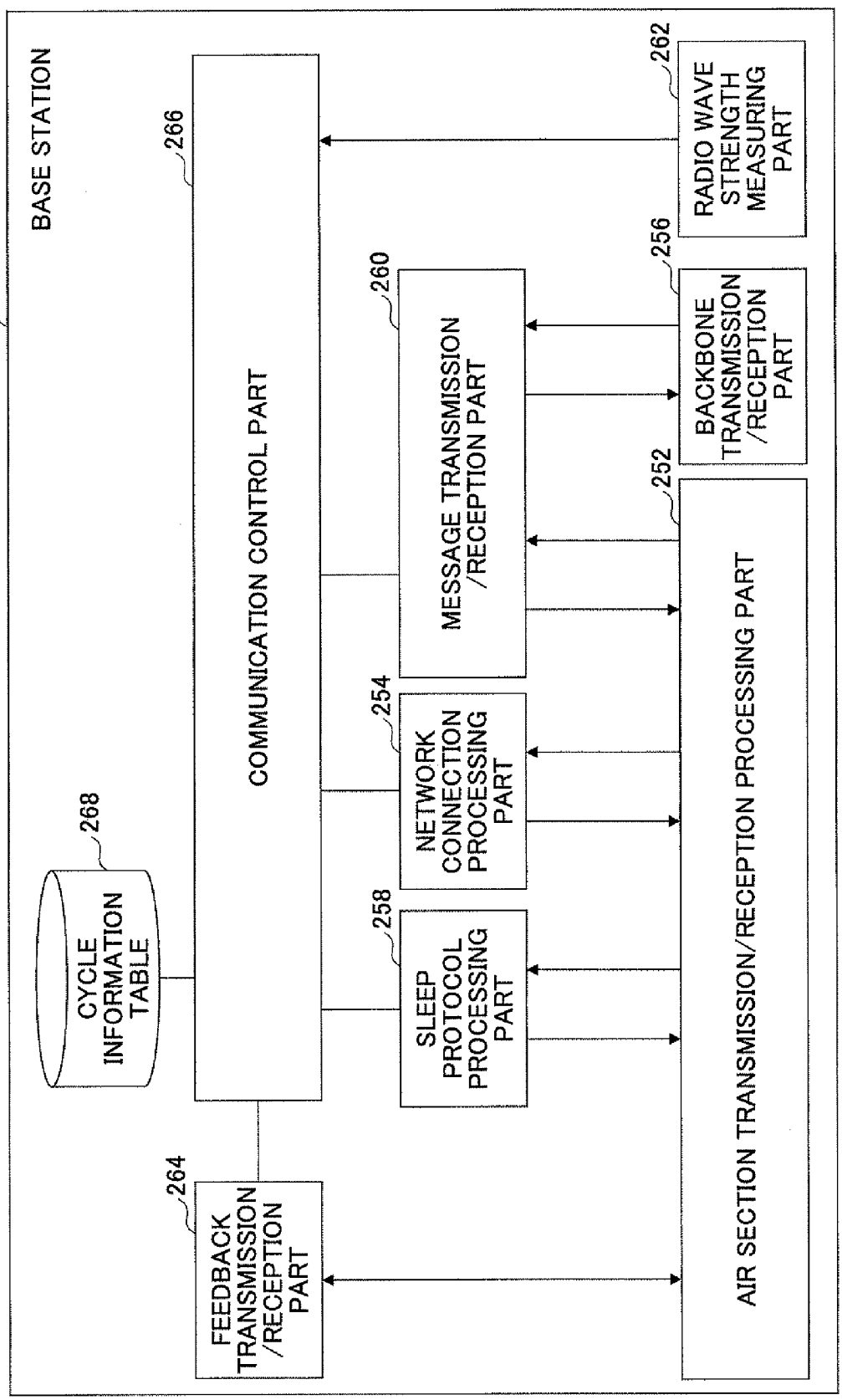
FIG. 5 is a schematic diagram illustrating a block diagram of a base station according to an embodiment of the present invention.

The base station 200 according to an embodiment of the present invention is described with reference to FIG. 5.

The base station 200 according to an embodiment of the present invention includes an air section transmission/reception processing part 252. The air section transmission/reception processing part 252 converts various messages received from the below-described various processing parts into radio waves that are to be transmitted to the mobile station 100. Then, the air section transmission/reception processing part 252 transmits the radio waves containing the various messages to the mobile station 100. Then, the air section transmission/reception processing part 252 extracts the messages included in the radio waves received from the mobile station 100. Then, the air section transmission/reception processing part 252 inputs the extracted messages to each of the processing parts.

The base station 200 according to an embodiment of the present invention includes a network connection processing part 254. The network connection processing part 254 executes a registration procedure protocol between the base station 200 and the mobile station 100. The network connection processing part 254 inputs messages to the air section transmission/reception processing part 252 for exchanging control messages with the mobile station 100. Further, the network connection processing part 254 receives control messages from the mobile station 100. Even after completing the registration procedure, the network connection processing part 254 periodically exchanges messages with the mobile station 100 for confirming the presence of the mobile station 100.

The base station 200 according to an embodiment of the present invention includes a backbone transmission/reception part 256. The backbone transmission/reception part 256 performs reception/transmission of data for exchanging messages with other base stations via a backbone network.

The base station 200 according to an embodiment of the present invention includes a sleep protocol processing part 258. The sleep protocol processing part 258 exchanges protocol messages with the mobile station 100 so that the base station 200 and the mobile station 100 can synchronize and perform intermittent communications with each other. The protocol message exchanged with the mobile station 100 may include a message for performing negotiations for intermittent communications. The message for performing negotiations for intermittent communications may include a combined period having both a period of performing data transmission/reception and a period of not performing data transmission/reception where the dynamic cycle mode is not used. Further, the message for performing negotiations for intermittent communications may include a period of performing data transmission/reception and/or a period of not performing data transmission/reception where the dynamic cycle mode is not used. Further, the protocol message may also include a start frame for performing negotiations for intermittent communications.

The base station 200 according to an embodiment of the present invention includes a message transmission/reception part 260. The message transmission/reception part 260 receives user data destined to the mobile station from the backbone network and transmits the received user data on the air. For example, the message transmission/reception part 260 receives user data destined to the mobile station 100 from the backbone transmission/reception part 256 and inputs the user data to the air section transmission/reception processing part 252. Further, the message transmission/reception part 260 receives user data from the mobile station 100 via the air section and transfers the user data to the backbone network. For example, the message transmission/reception part 260 receives user data from the mobile station 100 from the air section transmission/reception part 252 and inputs the user data to the backbone transmission/reception part 256. Further, the message transmission/reception part 260 determines the existence of traffic destined for the mobile station 100.

The base station 200 according to an embodiment of the present invention includes a radio wave strength measuring part 262. The radio wave strength measuring part 262 measures the strength of the radio waves with respect to the location of the mobile station 100 transmitting signals in a frame. Further, the radio wave strength measuring part 262 identifies the radio wave strength of the uplink transmitted by the mobile station 100.

The base station 200 according to an embodiment of the present invention includes a feedback transmission/reception part 264. The feedback transmission/reception part 264 receives feedback signals transmitted from the mobile station 100 during the period of data transmission/reception. Further, the feedback transmission/reception part 264 instructs the below-described communication control part 266 to change the intermittent cycle depending on whether there are any feedback signals (existence of feedback signals).

The base station 200 according to an embodiment of the present invention includes a communication control part 266. The communication control part 266 dynamically changes the intermittent cycle. For example, the communication control part 266 may dynamically change the intermittent cycle according to the existence of traffic. For example, the communication control part 266 may dynamically change the intermittent cycle depending on whether there are any data destined for the mobile station 100. In a case where the communication control part 266 dynamically changes the intermittent cycle, the period of performing data transmission/reception and/or the period of not performing data transmission/reception may be changed. Further, in a case where the communication control part 266 dynamically changes the intermittent cycle, the combined period having both the period of performing data transmission/reception and the period of not performing data transmission/reception (i.e. cycle) may be changed. Further, in a case where the communication control part 266 dynamically changes the intermittent cycle, the combined period (i.e. cycle) may be changed together with changing the period of performing data transmission/reception and/or the period of not performing data transmission/reception. For example, in a case where the message transmission/reception part 260 reports the existence of traffic to the communication control part 266, the communication control part 266 may change the intermittent cycle so that the period of performing data transmission/reception for receiving the feedback signals (feedback response) from the mobile station 100 is extended. Further, in a case where there is no standby traffic destined for the mobile station 100, the communication control part 266 changes the intermittent cycle by shortening the period where no feedback is received.

Further, the communication control part 266 may shorten the intermittent cycle during the period of receiving no feedback according to the existence of standby traffic of a previous period.

Further, in a case where a feedback response cannot be received from the mobile station 100, the communication control part 266 may determine that the base station 200 cannot communicate with the mobile station 100.

Further, the communication control part 266 may determine that the base station 200 cannot communicate with the mobile station 100 according to the results of measuring the strength of the radio waves received from the mobile station 100.

Further, in a case where the traffic is eliminated (i.e. transmission of standby traffic is completed) as a result of communicating with the changed cycle, the communication control part 266 may terminate the dynamic cycle mode and return to its initial intermittent cycle. For example, the communication control part 208 may return to its regular cycle.

The base station 200 according to an embodiment of the present invention includes a cycle information table 268. The cycle information table 268 contains information of the combined period (cycle) having both the period of performing data transmission/reception and the period of not performing data transmission/reception in a case where the dynamic cycle mode is not used in the communication between the base station 200 and the mobile station 100. The combined period may be plural. The information of the combined period (cycle) may include information indicating the period of performing data transmission/reception. The information indicating the period of performing data transmission/reception may be plural. Further, the information of the combined period (cycle) may include information indicating the period of not performing data transmission/reception. The information indicating the period of not performing data transmission/reception may be plural.

Figure 6:
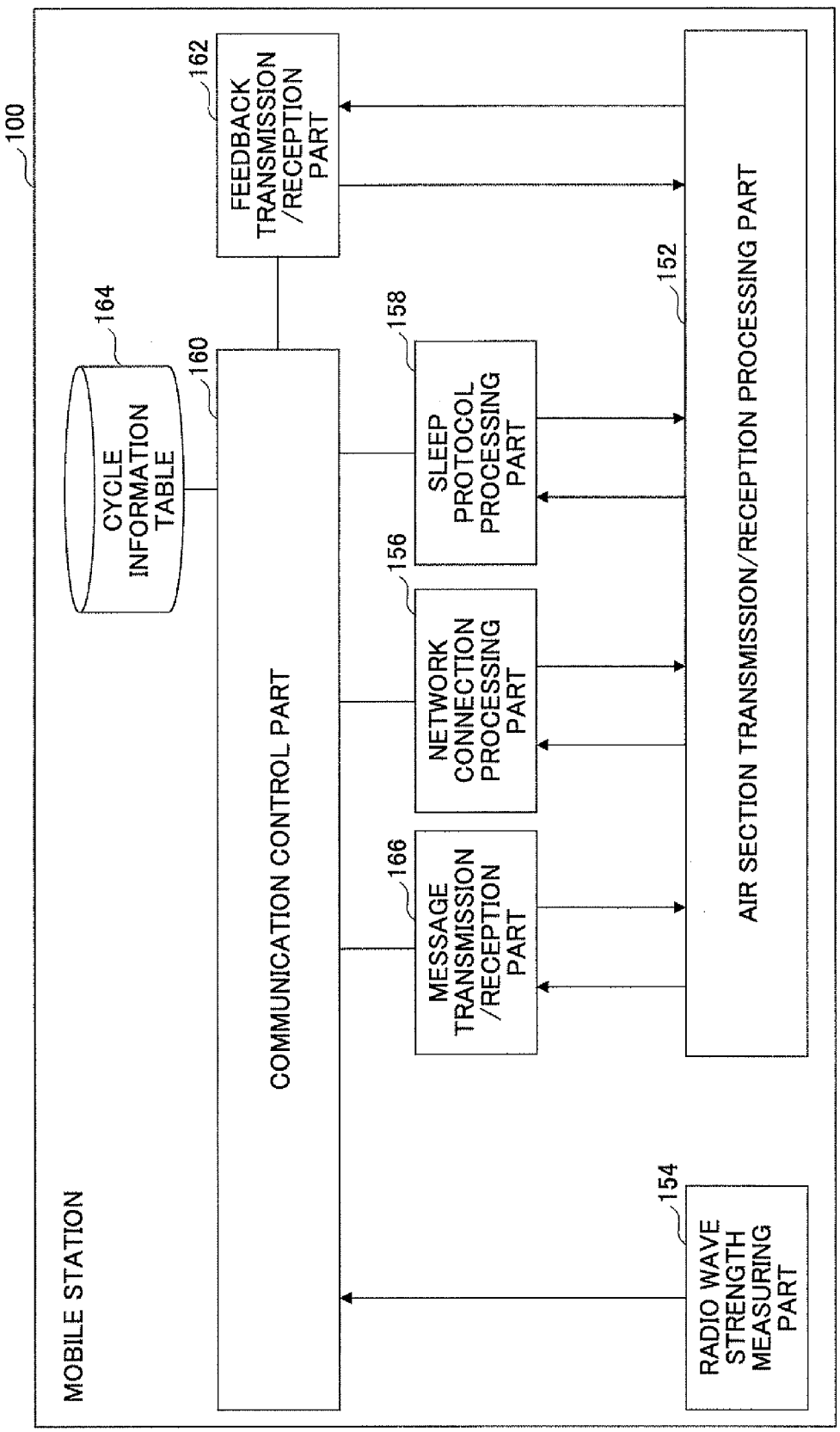
FIG. 6 is a block diagram illustrating mobile station according to an embodiment of the present invention.

Next, the mobile station 100 according to an embodiment of the present invention is described with reference to FIG. 6.

The mobile station 100 according to an embodiment of the present invention includes an air section message transmission/reception processing part 152. The air section message transmission/reception processing part 152 synchronizes with the frames from the base station 200 and performs transmission/reception of frames in accordance with conditions set for connecting with the base station 200.

The mobile station 100 according to an embodiment of the present invention includes a radio wave strength measuring part 154. The radio wave strength measuring part 154 measures the strength of radio waves based on synchronizing frames.

The mobile station 100 according to an embodiment of the present invention includes a network connection processing part 156. The network connection processing part 156 processes protocol messages used for enabling the mobile station 100 to connect to a network and exchanges the protocol messages with the base station 200.

The mobile station 100 according to an embodiment of the present invention includes a sleep protocol processing part 158. The sleep protocol processing part 158 exchanges protocol messages with the base station 200 so that the mobile station 100 and the base station 200 can synchronize and perform intermittent communications with each other. The protocol message exchanged with the mobile station 100 may include a message for performing negotiations for intermittent communications. Further, the protocol message may also include a start frame for performing negotiations for intermittent communications.

The mobile station 100 according to an embodiment of the present invention includes a communication control part 160. The communication control part 160 permits transmission/reception of messages in a communication-able period according to the intermittent cycle negotiated between the sleep protocol processing part 158 and the base station 200. Further, the communication control part 160 stops transmission/reception of messages in an communication-not able period according to the intermittent cycle. Further, the communication control part 160 controls the power and/or the clock of each processing part of the mobile station 100 together with stopping the transmission/reception of messages.

The mobile station 100 according to an embodiment of the present invention includes a feedback transmission/reception part 162. The feedback transmission/reception part 162 receives feedback signals transmitted from the base station 200 during the communication-able period. The feedback transmission/reception part 162 instructs the below-described communication control part 160 to change the intermittent cycle depending on whether there is any reception of feedback signals (existence of feedback signals).

The mobile station 100 according to an embodiment of the present invention includes a cycle information table 164. The cycle information table 164 contains information of the combined period (cycle) having both the period of performing data transmission/reception and the period of not performing data transmission/reception in a case where the dynamic cycle mode is not used in the communication between the base station 200 and the mobile station 100. The combined period may be plural. The information of the combined period (cycle) may include information indicating the period of performing data transmission/reception. The information indicating the period of performing data transmission/reception may be plural. Further, the information of the combined period (cycle) may include information indicating the period of not performing data transmission/reception. The information indicating the period of not performing data transmission/reception may be plural. Further, the cycle information table 164 contains information of the combined period (cycle) having combined the period of performing data transmission/reception and the period of not performing data transmission/reception in a case where the dynamic cycle mode is used in the communications between the base station 200 and the mobile station 100. The combined period may be plural. The information of the combined period (cycle) may include information indicating the period of performing data transmission/reception. The information indicating the period of performing data transmission/reception may be plural. Further, the information of the combined period (cycle) may include information indicating the period of not performing data transmission/reception. The information indicating the period of not performing data transmission/reception may be plural.

The mobile terminal 100 according to an embodiment of the present invention includes a message transmission/reception part 166. The message transmission/reception part 166 transmits user data destined for other mobile stations over the air. For example, the message transmission/reception part 166 inputs user data destined for other mobile stations to the air section transmission/reception processing part 152. Further, the message transmission/reception part 166 receives user data of other mobile stations received from the base station 200 via the air section 152. For example, the message transmission/reception part 166 inputs the user data of other mobile stations received from the air section transmission/reception processing part 152. Further, the message transmission/reception part 166 determines whether there is traffic destined for other mobile stations.

Next, an operation of the communication system 1000 according to an embodiment of the present invention is described.

In the following, there are described examples where the mobile station 100 moves from section A to section E as illustrated in FIG. 4. That is, exemplary cases where the mobile station 100 is located in section A, section B, section C, and section E are separately described below. A case where the mobile station 100 is located in section D is substantially the same as a case where the mobile station 100 is located in section B.

The case where the mobile station 100 is located in section A is referred to as a "first phase". In the first phase, negotiations for changing the dynamic intermittent communication mode between the base station 200 and the mobile station 100 are performed.

The case where the mobile station 100 is located in section B is referred to as a "second phase". In the second phase, radio waves become unstable during communications between the base station 200 and the mobile station 100. In this second phase, it is determined that communications cannot be performed. In the second phase, the intermittent cycle is changed.

The case where the mobile station 100 is located in section C is referred to as a "third phase". In the third phase, radio waves are also unstable during communications between the base station 200 and the mobile station 100. However, in this third phase, it is determined that communications can be performed. In the third phase, the intermittent cycle changed in the second phase is maintained.

The case where the mobile station 100 is located in section E is referred to as a "fourth phase". In the fourth phase, radio waves become stable during communications between the base station 200 and the mobile station 100. In this fourth phase, a predetermined dynamic cycle mode is used for the communications between the base station 200 and the mobile station 100.

(First Phase)

Figure 7:
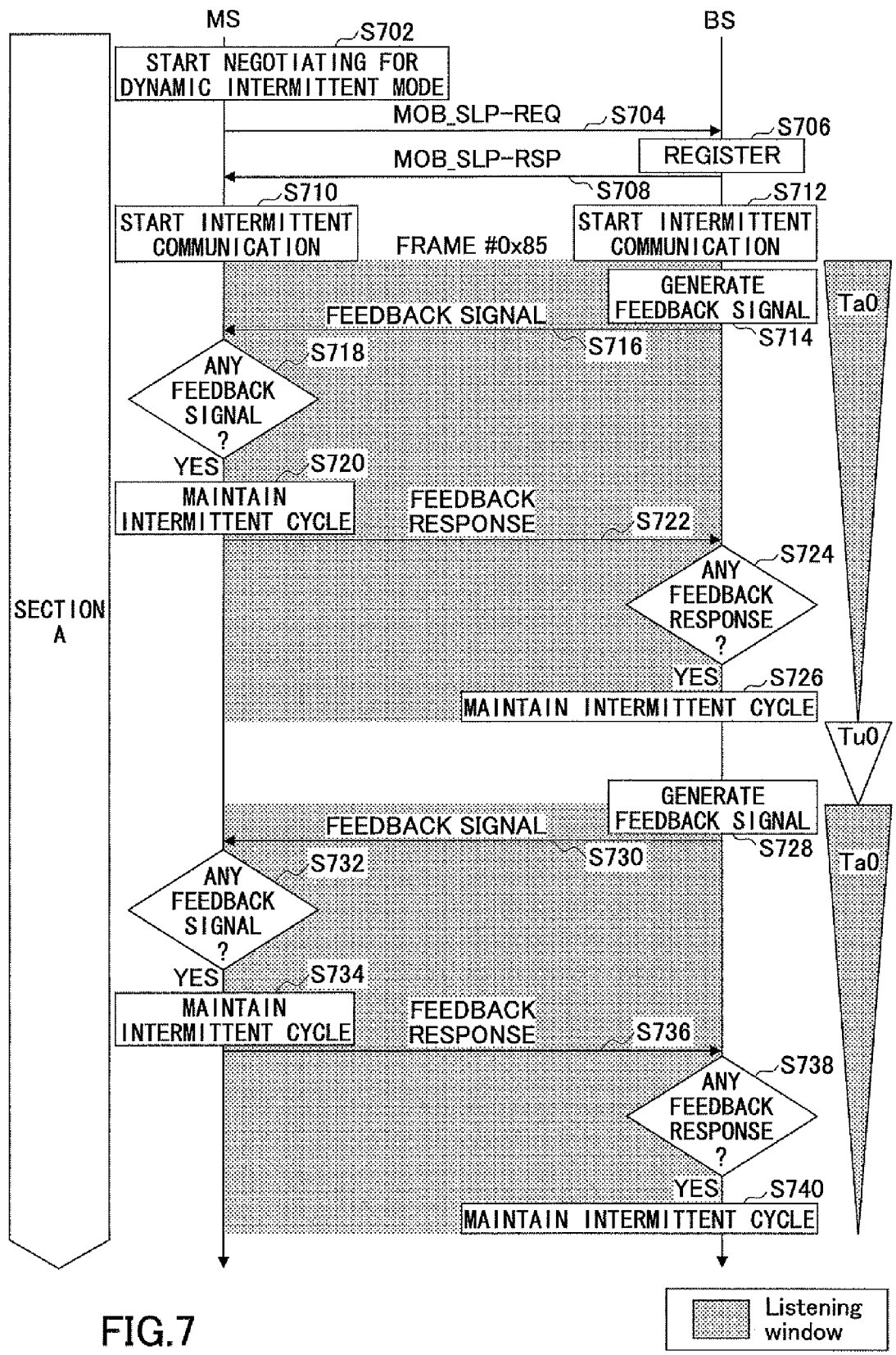
FIG. 7 is a schematic diagram for describing a flow of an operation of a communication system according to an embodiment of the present invention.

The first phase is described with reference to FIG. 7.

In the first phase, negotiations between the mobile station 100 and the base station 200 are performed for starting an intermittent communication operation. As described above, the mobile station 100 performs intermittent communication with the base station 200 at an area (section) in which regular communications can be performed. For example, negotiations for starting an intermittent communication operation are performed between the communication control part 160 of the mobile station 100 and the communication control part 266 of the base station 200. The negotiations for starting the intermittent communication operation include negotiation of the dynamic cycle mode.

The mobile station 100 starts the negotiation of the dynamic cycle mode (Step S702). For example, the communication control part 160 starts the negotiation of the dynamic cycle mode with a predetermined trigger. The predetermined trigger may include initiation of an application which does not require a significantly wide bandwidth in an upper layer but has a degrading of sound quality unless messages are received at predetermined intervals. The application may be, for example, VoIP (Voice over Internet Protocol). In this case, the communication control part 160 starts the dynamic cycle mode. The application may be associated with the dynamic cycle mode. The upper layer may include a process that is executed by a personal computer (PC).

Further, the communication control part 160 may determine whether to start the negotiation of the dynamic cycle mode according to the strength of the radio waves measured by the radio wave strength measuring part 154. For example, in a case where the communication control part 160 determines the strength of the radio waves is not so weak as to disconnect communications with the base station 200 according to the value of the measured radio wave strength but detects that downlink signals from the base station 200 cannot be received for a number of times, the communication control part 160 may determine that the mobile station 100 is located in an area in which radio wave reception is unstable. The downlink signal may include, for example, a DL-MAP. In a case where the communication control part 160 determines that the mobile station 100 is located in an area in which radio wave reception is unstable, the communication control part 160 may determine to change communication with the base station 200 to the dynamic cycle mode. In this case, the communication control part 160 may start the dynamic cycle mode.

Further, the communication control part 160 may start the dynamic cycle mode according to an explicit instruction from the user of the mobile station 100. The user of the mobile station 100 may determine whether the location of the mobile station 100 is difficult for radio waves to reach, for example, by observing the surroundings of the user. In a case where the user desires to continue communication over the application which is currently being used by the user at higher quality, the user can explicitly instruct such a desire to the mobile station 100. The application may include, for example, an internet television or an internet radio using IP communications.

In a case where the mobile station 100 determines to start the dynamic cycle mode, the mobile station 100 transmits a sleep request message (MOB_SLP-REQ) to the base station 200 (Step S704). The sleep request message may include a frame number for starting the dynamic cycle mode. The sleep request message may include information of the intermittent cycle to be dynamically changed. The power saving class to be used when performing intermittent communication can be designated. For example, the power saving class to be used may be selected from plural types of power saving classes. For example, in addition to the above-described three types of power saving classes (PSC types 1-3) which exhibit different behaviors (processes), a fourth type of power saving class may be prepared. Thus, the four types of power saving classes may be referred to as power saving class types 1-4 (PSC types 1-4).

Accordingly, the mobile station 100 selects a power saving class depending on the intermittent communication desired to be performed. Further, the mobile station 100 sets the intermittent cycle. Further, the mobile station 100 generates a definition(s) of the intermittent cycle. The definition of the intermittent cycle may be referred to as a power saving class (PSC) instance. The mobile station 100 can define different power saving class instances for the power saving classes even where the power saving classes are the same. For example, the mobile station may define different VoIP sessions in correspondence with plural PSCs having different intermittent cycles.

In IEEE 802.16e, a connection in communications is distinguished according to identifiers. The identifier may be referred to as a connection ID (CID, connection identifier). The mobile terminal 100 maps the CID on the PSC instance. Accordingly, the mobile station 100 can negotiate the correspondence between CIDs and the behavior defined in each PSC with the base station 200. In other words, the mobile station 100 can negotiate with the base station 200 in terms of the power saving class to be applied to the connection corresponding to the CID. Further, the mobile station 200 can negotiate the intermittent cycle to be used in communication with the base station 200 based on which CID is mapped to the intermittent cycle defined in the PSC instance. In other words, the mobile station 100 can negotiate with the base station 200 in terms of the intermittent cycle to be applied to the connection corresponding to the CID.

As one example of the information included in the sleep request, the fields of the MOB_SLP-REQ of IEEE 802.16e are described with reference to FIG. 8.

The MOB_SLP-REQ message may include a management message type ("Management Message Type"). The management message type is a field for indicating that the message type is a MOB_SLP-REQ message. For example, the management message type is defined as 0x50 according to IEEE 802.16e-2005.

The MOB_SLP-REQ message may include number of classes ("Number of Classes"). The number of classes indicates the number of PSC instances defined in the MOB_SLP-REQ message.

The MOB_SLP-REQ message may include a definition ("Definition"). The definition indicates whether a definition of a PSC instance is included in the MOB_SLP-REQ message. For example, in a case where the definition is indicated as "1", a definition is included in the MOB_SLP-REQ message. In a case where the definition is indicated as "0", a definition is not included in the MOB_SLP-REQ message. For example, the definition may be used to activate (start intermittent communication) or deactivate (temporarily stop intermittent communication) a PSC instance that is already defined in a case where the definition is indicated as 0.

The MOB_SLP-REQ message may include an operation ("Operation"). The operation is for instructing to temporarily stop intermittent communication or to start intermittent communication. For example, in a case where the operation is indicated as "0", deactivation of intermittent communication is instructed. In a case where the operation is indicated as "1", activation of intermittent communication is instructed.

The MOB_SLP-REQ message may include a power saving class ID ("Power_Saving_Class_ID"). The power saving class ID is a number for identifying a unique PSC instance inside the mobile station 100.

The MOB_SLP-REQ message may include a start frame number ("Start Frame Number"). The start frame number is a number for indicating the starting frame of the first sleep window.

The MOB_SLP-REQ message may include a power saving class type ("Power Saving Class Type"). The power saving class type may indicate the above-described types of power saving classes (e.g., 0b01=Type I, 0b10=Type II, 0x11=Type III). Further, the power saving class type may also indicate a newly defined power saving class type (e.g., 0b100=Type IV).

The MOB_SLP-REQ message may include direction ("Direction"). The direction indicates the direction of the CID included in a PSC. For example, "0b00" indicates no designation of direction and complies to the direction of the CID assigned to the CID when the CID is generated. The direction may also indicate an uplink (UL) direction, a downlink (DL) direction, or both directions. For example, "0b01" may indicate designation of the DL direction, and "0b10", may indicate designation of the UL direction.

The MOB_SLP-REQ message may include a traffic indication request ("TRF-IND_required"). The traffic indication request is a bit for designating transmission of a MOB_TRF-IND message in a case where the base station 200 finds traffic destined to the mobile station 100 in PSC Type 1. In a case where the traffic indication request is indicated as "1", traffic indication is requested. Although an example of the PSC Type 2 is described in this embodiment, other types of power saving classes may be used.

The MOB_SLP-REQ message may include a traffic triggered wakening flag ("Traffic Triggered Wakening flag"). In a case where traffic destined to the mobile station 100 is generated in the PSC Type 1, the traffic triggered wakening flag designates whether to deactivate the PSC instance in the middle of performing intermittent communication. For example, in a case where the traffic triggered wakening flag is indicated as "0", the PSC instance may not deactivated, and in a case where the traffic triggered wakening flag is indicated as "1", the PSC instance may be deactivated. Although an example of the PSC Type 2 is described in this embodiment, other types of power saving classes may be used.

The MOB_SLP-REQ message may include an initial sleep window ("Initial Sleep Window"). The initial sleep window designates the length of an initial sleep window (period of performing no data transmission/reception, communication impossible period) during intermittent communication in frame units.

The MOB_SLP-REQ message may include a listening window ("Listening Window"). The listening window designates the length of a listening window (period of performing data transmission/reception, communication possible period) during intermittent communication in frame units.

The MOB_SLP-REQ message may include a final sleep window base ("Final sleep window base"). In the final sleep window base, the maximum value of the Sleep window of the PSC Type 1 and the PSC Type 3 is expressed as final-sleep window=final-sleep window base×2^(final-sleep window exponent). In this embodiment, since an example of the PSC Type 2 is described, the value of the field "Final sleep window base" is designated as "0".

The MOB_SLP-REQ message may include a final sleep window exponent ("Final sleep window exponent"). In the final sleep window exponent, the maximum value of the Sleep window of the PSC Type 1 and the PSC Type 3 is expressed as final-sleep window=final-sleep window base×2^(final-sleep window exponent). In this embodiment, since an example of the PSC Type 2 is described, the value of the field "Final sleep window exponent" is designated as "0".

The MOB_SLP-REQ message may include an unstable unavailable listening window (Unstable unavailable listening window). In this embodiment, the unstable unavailable listening window indicates the value of the listening window to be changed when communication becomes unstable during the dynamic cycle mode. That is, the unstable unavailable listening window indicates the value of the listening window in a case where radio wave reception is unstable and communication cannot be performed during the dynamic cycle mode.

The MOB_SLP-REQ message may include unstable unavailable sleep window (Unstable unavailable sleep window). In this embodiment, the unstable unavailable sleep window indicates the value of the sleep window to be changed when communication becomes unstable during the dynamic cycle mode. That is, the unstable unavailable sleep window indicates the value of the sleep window in a case where radio wave reception is unstable and communication cannot be performed during the dynamic cycle mode.

The MOB_SLP-REQ message may include unstable available listening window (Stable available listening window). In this embodiment, the unstable available listening window indicates the value of the listening window to be changed when communication temporarily becomes stable during the dynamic cycle mode. That is, the unstable available listening window indicates the value of the listening window in a case where radio wave reception is unstable while communication can be performed during the dynamic cycle mode. The value of the listening window in this case may include a value indicating a case where there is standby traffic for the mobile station 100 and/or a value indicating a case where there is no standby traffic for the mobile station 100.

The MOB_SLP-REQ message may include an unstable available sleep window (Stable available sleep window). In this embodiment, the unstable available sleep window indicates the value of the sleep window to be changed when communication temporarily becomes unstable during the dynamic cycle mode. That is, the unstable available sleep window indicates the value of the sleep window in a case where radio wave reception is unstable while communication can be performed during the dynamic cycle mode. The value of the sleep window in this case may include a value indicating a case where there is standby traffic for the mobile station 100 and/or a value indicating a case where there is no standby traffic for the mobile station 100.

The MOB_SLP-REQ message may include the number of connection identifiers (Number of CIDs). The number of CIDs indicates the number of CIDs mapped by the PSC instance. The number of CIDs designated may be plural.

The MOB_SLP-REQ message may include a connection ID (CID). The connection ID indicates the value of the CID mapped by the PSC instance. The CIDs designated may be plural.

Among the information included in the sleep request, the listening window, the final sleep window base, the unstable unavailable listening window, the unstable unavailable sleep window, the unstable available listening window, and the unstable available sleep window may be selected from the information stored in the cycle information table 164. For example, the cycle information table 164 includes a power saving class ID (PSC ID) and listening and sleep windows corresponding to each power saving class ID that are decided according to communication conditions. The communication conditions include, for example, a case where communications can be performed normally (regular communication). Further, the communication conditions include, for example, a case where communications can be performed in a condition where reception of radio waves is unstable (radio wave unstable communication possible). Further, the communication conditions include, for example, a case where communications cannot be performed in a condition where reception of radio waves is unstable (radio wave unstable communication impossible). Further, in the case where communication condition is "radio wave unstable communication possible", the listening window and the sleep window may be divided depending on a case where there is traffic destined to other mobile stations and another case where there is no traffic destined to other mobile stations.

The base station 200 receiving the MOB_SLP-REQ determines whether the PSC instance requested by the mobile station 100 can be approved. In a case where the PSC instance can be approved, the base station 200 registers the parameters of the PSC instance requested by the mobile station 100 in the cycle information table 268 (Step S706). For example, the PSC ID of the mobile station 100 and the intermittent communication cycle corresponding to the communication condition of the mobile station 100 may be registered for each mobile station 100 in the cycle information table 268. For example, the communication condition may include a case where communication can be performed normally (regular communication). Further, the communication condition may include a case where reception of radio waves is unstable but communication can be performed (radio wave unstable communication possible). Further, the communication condition may include a case where reception of radio waves is unstable and communication cannot be performed (radio wave unstable communication impossible).

Further, periods of the listening window and the sleep window during the intermittent reception cycle may be registered in correspondence with the communication conditions. Further, different listening windows and sleep windows may be registered according to a case where there is traffic transmitted from the mobile station 100 to the base station 200 and a case where there is no traffic transmitted from the mobile station 100 to the base station 200.

Then, the base station 200 transmits a sleep response message (MOB_SLP-RSP) to the mobile station 100 (Step S708).

As one example of the information included in the sleep response request, the fields of the MOB_SLP-RSP of IEEE 802.16e are described with reference to FIG. 10. In the following, information elements different from those included in the above-described MOB_SLP-REQ (see FIG. 8) are described. With respect to the information items which are the same as those included in the above-described MOB_SLP-REQ, the values the same as those of the MOB_SLP-REQ may be stored in the sleep response message and transmitted to the mobile station 100.

The MOB_SLP-RSP message may include the length of data (Length of Data). The length of data may include the total size of the PSC definition parameters written inside the "for" loop.

The MOB_SLP-RSP message may include sleep approval (Sleep Approved). The sleep approval indicates whether the PSC instance requested by the mobile station 100 has been approved by the base station 200. For example, "1" of the sleep approval indicates that the PSC instance requested by the mobile station 100 is approved by the base station 200, and "0" of the sleep approval indicates that the PSC instance requested by the mobile station 100 is not approved by the base station 200.

Then, the mobile station 100 and the base station 200 start intermittent communication in accordance with the sleep response message MOB_SLP-RSP. For example, the listening window is started (Step S710, S712). Alternatively, the intermittent communication may be started from the initial sleep window. Whether to start from the initial listening window or the initial sleep window is decided by the negotiation between the mobile station 100 and the base station 200. This embodiment describes a case where the intermittent communication is started from the start of the listening window. For example, the mobile station 100 and the base station 200 may start the initial listening window from a frame matching the Start Frame Number included in the sleep response message. In the example of FIG. 7, the Start Frame Number is frame #0x85. The base station 200 starts a period Ta0 that monitors the duration of the listening window.

In FIGS. 7, 13, 14, and 15, the reference number "Ta0" represents the same timer. The hatching area illustrated in FIGS. 7, 13, 14, and 15 represent the listening window.

Further, in the sleep response message, "Frame Offset" indicates that the offset between the frame in which the mobile station 100 receives a feedback signal from the base station 200 and a frame in which the mobile station 100 transmits a feedback response to the base station 200.

Further, in the sleep response message, "OFDMA symbol offset", "Subchannel offset", "No. OFDMA symbols", and "No. subchannel" indicate feedback information transmission location of the frame in which the feedback response is transmitted.

Then, the base station 200 generates a feedback signal to be transmitted to the mobile station 100 (Step S714).

For example, as illustrated in FIG. 11, the feedback signal may include a format (FMT) used for a traffic indication message as illustrated in FIG. 11. The FMT indicates switching between instructing deactivation of a PSC with a SLPID bitmap and instructing deactivation of a PSC by directly designating a SLPID.

The feedback signal may include a sleep ID group indication bitmap (SLPID-Group Indication Bitmap). In this embodiment, the SLPIDs are 0 through 1023. The SLPIDs are divided into 32 SLPID groups. The SLPID indicate the existence of traffic with respect to each of the groups. For example, among 32 bits, the most significant bit (MSB) may be indicated as "group 0" and the least significant bit (LSB) may be indicated as "group 32". The mobile station 100 including a PSC of a given group is to refer to the next traffic indication bitmap in a case where "1" is set as the bit of the group.

The feedback signal may include a traffic indication bitmap (Traffic Indication Bitmap). The traffic indication bitmap indicates traffic with respect to each PSC included in the SLPID group indicated as having traffic by the SLPID. Each group includes 32 PSCs. The traffic indication bitmap indicates the existence of traffic with respect to each of the PSCs with a field of 32 bits. The 32 bit field is indicated in correspondence with the number of SLPID groups set as "1".

The feedback signal may include "Num_pos". The "Num_pos" indicates the number of SLPIDs indicating as having traffic.

The feedback signal may include "SLPIDs". The "SLPIDs" indicates the IDs of the PSCs indicated as having traffic. For example, the SLPIDs are arranged in a number corresponding to the number indicated by the "Num_pos".

In this embodiment, the feedback signal may include "Num_dynamic_PSC". The "Num_dynamic_PSC" indicates the number of PSCs to which the PSC Type 4 is set as the PSC type.

In this embodiment, the feedback signal may include next traffic prediction ("Next Traffic Prediction"). The next traffic prediction indicates whether there is traffic with respect to a PSC of a SLPID. For example, "1" indicates the existence of traffic, and "0" indicates no existence of traffic.

In this embodiment, an arbitrary value is assigned to the information elements included in the fields except for the fields "Num_dynamic_PSC", "for" "SLPID", and "Next traffic prediction" according to circumstance.

Then, the base station 200 broadcasts the feedback signal to the mobile station 100 in the listening window (Step S716). The listening window may also be referred to as "listening interval".

Then, the mobile station 200 determines whether it has received a feedback signal from the base station 200 (Step S718). In this embodiment, since the mobile station 100 can receive the feedback signal (Yes in Step S718), no change of intermittent cycle is performed (Step S720). Thus, the mobile station 100 maintains the current intermittent cycle.

Then, the mobile station 100 generates a feedback response to be transmitted to the base station 200 in response to the feedback signal. For example, the mobile station 100 may generate and transmit the feedback response according to the MOB_SLP-RSP described above with reference to FIG. 10. For example, the mobile station 100 may transmit a feedback channel at a frame location defined in the frame designated by the MOB_SLP-RSP message. The feedback channel may include a feedback code(s). As illustrated in FIG. 12, the feedback code may include a code transmitted when no feedback signal is received, a code transmitted when there is no uplink traffic, and a code transmitted when there is uplink traffic.

Then, the mobile station 100 transmits the feedback response to the base station 200 (Step S722).

The base station 200 determines whether it has received a feedback response from the mobile station 100 (Step S724). In this step, since the base station 200 can receive the feedback response (Yes in Step S724), no change of intermittent cycle is performed (Step S726). That is, the base station 200 determines that the same cycle as the current intermittent cycle is to be applied to the next intermittent cycle. Thus, the base station 200 maintains the current intermittent cycle. The base station 200, regardless of the meaning of the code included in the feedback response, determines that the mobile station 100 can receive radio waves transmitted from the base station 200 by the reception of the feedback response.

The mobile station 100 and the base station 200 start the Sleep window in period Tu0 according to the intermittent cycle decided between the mobile station 100 and the base station 200. In this embodiment, the intermittent cycle includes the listening window of the period Ta0 and the sleep window of the period Tu0.

The base station 200 and the mobile station 100 each start the listening window when the period Tu0 elapses.

The base station 200 generates a feedback signal again (Step S728) and transmits the feedback signal to the mobile station 100 (Step S730).

In a case where the mobile station 100 receives the feedback signal from the base station 200, the mobile station 100 determines that the same cycle as the current intermittent cycle is to be applied to the next intermittent cycle (Yes in Step 734).

Then, the mobile station 100 transmits a feedback response to the base station 200 (Step S736).

The base station 200 determines whether it has received a feedback response from the mobile station 100 (Step S738). In this step, since the base station 200 can receive the feedback response (Yes in Step S738), no change of intermittent cycle is performed (Step S740). That is, the base station 200 determines that the same cycle as the current intermittent cycle is to be applied to the next intermittent cycle. Thus, the base station 200 maintains the current intermittent cycle. The base station 200, regardless of the meaning of the code included in the feedback response, determines that the mobile station 100 can receive radio waves transmitted from the base station 200 by the reception of the feedback response.

(Second Phase)

Figure 13:
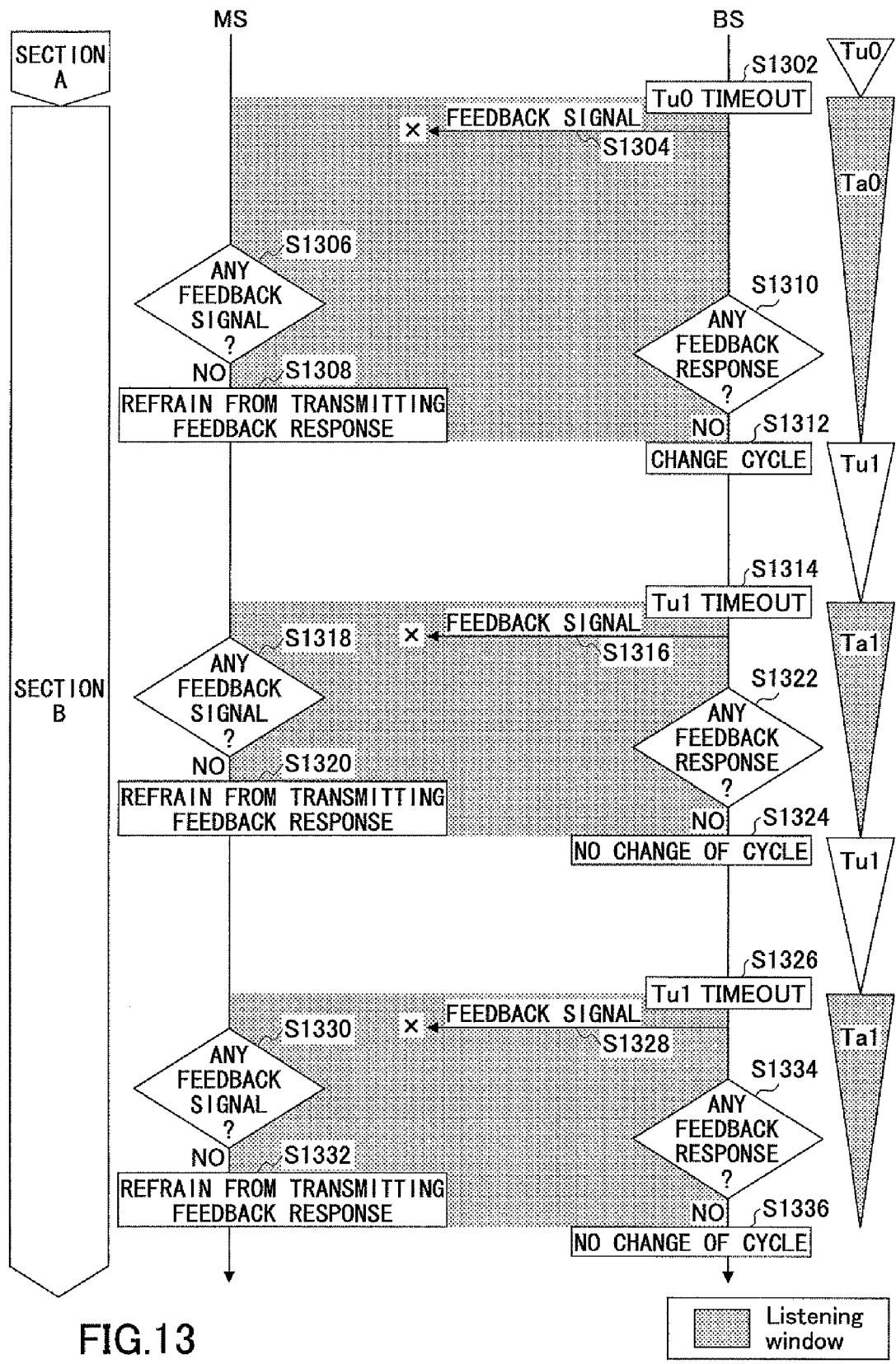
FIG. 13 is a schematic diagram for describing a flow of an operation of a communication system according to an embodiment of the present invention.

The second phase is described with reference to FIG. 13.

In the second phase, the mobile station 100 moves from section A to section B described above with reference to FIG. 4.

The base station 200 and the mobile station 100 each start the listening window when the period Tu0 of the sleep period elapses (Step S1302). For example, in a case where the mobile station 100 is located in section A, the base station 200 continues the sleep window for a period Tu0. Then, the base station 200 broadcasts a feedback signal (feedback message) to the mobile station 100 in the listening window when the period Tu0 elapses (Step S1304).

Then, the mobile station 100 determines whether it has received a feedback signal from the base station 200 (Step S1306). In a case where the mobile station 100 moves to section B, the feedback signal transmitted from the base station 200 cannot reach the mobile station 100. That is, since the mobile station 100 becomes hidden behind a building from the standpoint of the base station 200, the mobile station 100 cannot receive the feedback signal transmitted from the base station 200. Since the mobile station 100 cannot receive the feedback signal from the base station 200 (No in Step S1306), the mobile station 100 determines that the mobile station 100 is located in an area in which radio wave reception is unstable. Accordingly, the mobile station 100 refrains from transmitting a feedback response to the base station 200 (Step S1308). The mobile station 100 starts an operation dedicated to a case where the mobile station 100 is located in an area in which radio wave reception is unstable. More specifically, the mobile station 100 sets the intermittent cycle to listening window Ta1 and sleep window Tu1 of the communication condition "radio wave unstable communication impossible" (described above with reference to FIG. 9). Further, in a case where the radio wave reception condition temporarily recovers during the listening window to allow frames to be transmitted in the UL direction, the mobile station 100 may transmit a feedback channel (feedback response) to the base station 200. The feedback channel may include a code indicating that there is no feedback signal such as the code "0b0000" described above with reference to FIG. 12.

On the other hand, the base station 200 determines whether it has received a feedback response from the mobile station 100 (Step S1310). Since the base station 200 receives no feedback response from the mobile station 100, the base station 200 determines that the mobile station 100 is unable to stably receive radio waves from the base station 200 (No in Step S1310). In this case, the base station 200 decides to change the intermittent cycle (Step S1312). For example, the base station 200 sets the intermittent cycle to a cycle where the communication condition is radio wave unstable and communication impossible with respect to the mobile station 100. More specifically, the base station 200 sets the intermittent cycle to listening window Ta1 and listening window Tu1 of the communication condition "radio wave unstable communication impossible" (described above with reference to FIG. 9).

The base station 200 starts a sleep window (Tu1) according to the newly set cycle after the current listening window ends. In the cycle where radio wave reception is unstable and communication is impossible, the listening window is shorter compared to the cycle during section A. However, since the listening window becomes shorter, the listening window is set to appear more often (appears more frequently). Accordingly, the opportunity for the base station 200 and the mobile station 100 to find each other's radio waves can be increased.

Then, the base station 200 and the mobile station 100 start the sleep window.

Then, the base station 200 and the mobile station 100 start the listening window when the period Tu1 of the sleep window of the communication condition "radio wave unstable communication impossible" elapses (Step S1314). The base station 200 activates a timer. The timer measures the period Ta1 of the listening window.

The base station 200 broadcasts the feedback signal (feedback message) to the mobile station 100 in the listening window (listening interval) (Step S1316).

Then, the mobile station 100 determines whether it has received a feedback signal from the base station 200 (Step S1318). Since the mobile station 100 is located in section B, the feedback signal transmitted from the base station 200 cannot reach the mobile station 100. That is, since the mobile station 100 is hidden behind a building from the standpoint of the base station 200, the mobile station 100 cannot receive the feedback signal transmitted from the base station 200. Since the mobile station 100 cannot receive the feedback signal from the base station 200 (No in Step S1318), the mobile station 100 determines that the mobile station 100 is located in an area in which radio wave reception is unstable. Accordingly, the mobile station 100 refrains from transmitting a feedback response to the base station 200 (Step S1320). The mobile station 100 continues the operation dedicated to a case where the mobile station 100 is located in an area in which radio wave reception is unstable. In a case where the radio wave reception condition temporarily recovers during the listening window to allow frames to be transmitted in the UL direction, the mobile station 100 may transmit a feedback channel (feedback response) to the base station 200. The feedback channel may include a code indicating that there is no feedback signal such as the code "0b0000" described above with reference to FIG. 12.

On the other hand, the base station 200 determines whether it has received a feedback response from the mobile station 100 (Step S1322). Since the base station 200 receives no feedback response from the mobile station 100, the base station 200 determines that the mobile station 100 is still unable to stably receive radio waves from the base station 200 (No in Step S1322). In this case, the base station 200 determines to maintain the current intermittent cycle (Step S1324).

The base station 200 and the mobile station 100 start a sleep window after the current listening window ends.

Then, the base station 200 and the mobile station 100 start the listening window when the period Tu1 of the sleep window of the communication condition "radio wave unstable communication impossible" elapses (Step S1326). The base station 200 activates the timer. The timer measures the period Ta1 of the listening window.

Then, the base station 200 broadcasts the feedback signal (feedback message) to the mobile station 100 in the listening window (listening interval) (Step S1328).

Then, the mobile station 100 determines whether it has received a feedback signal from the base station 200 (Step S1330). Since the mobile station 100 is located in section B, the feedback signal transmitted from the base station 200 cannot reach the mobile station 100. That is, since the mobile station 100 is hidden behind a building from the standpoint of the base station 200, the mobile station 100 cannot receive the feedback signal transmitted from the base station 200. Since the mobile station 100 cannot receive the feedback signal from the base station 200 (No in Step S1330), the mobile station 100 determines that the mobile station 100 is located in an area in which radio wave reception is unstable. Accordingly, the mobile station 100 refrains from transmitting a feedback response to the base station 200 (Step S1332). The mobile station 100 continues the operation dedicated to a case where the mobile station 100 is located in an area in which radio wave reception is unstable. In a case where the radio wave reception condition temporarily recovers during the listening window to allow frames to be transmitted in the UL direction, the mobile station 100 may transmit a feedback channel (feedback response) to the base station 200. The feedback channel may include a code indicating that there is no feedback signal such as the code "0b0000" described above with reference to FIG. 12.

On the other hand, the base station 200 determines whether it has received a feedback response from the mobile station 100 (Step S1334). Since the base station 200 receives no feedback response from the mobile station 100, the base station 200 determines that the mobile station 100 is still unable to stably receive radio waves from the base station 200 (No in Step S1334). In this case, the base station 200 determines to maintain the current intermittent cycle (Step S1336).

(Third Phase)

Figure 14:
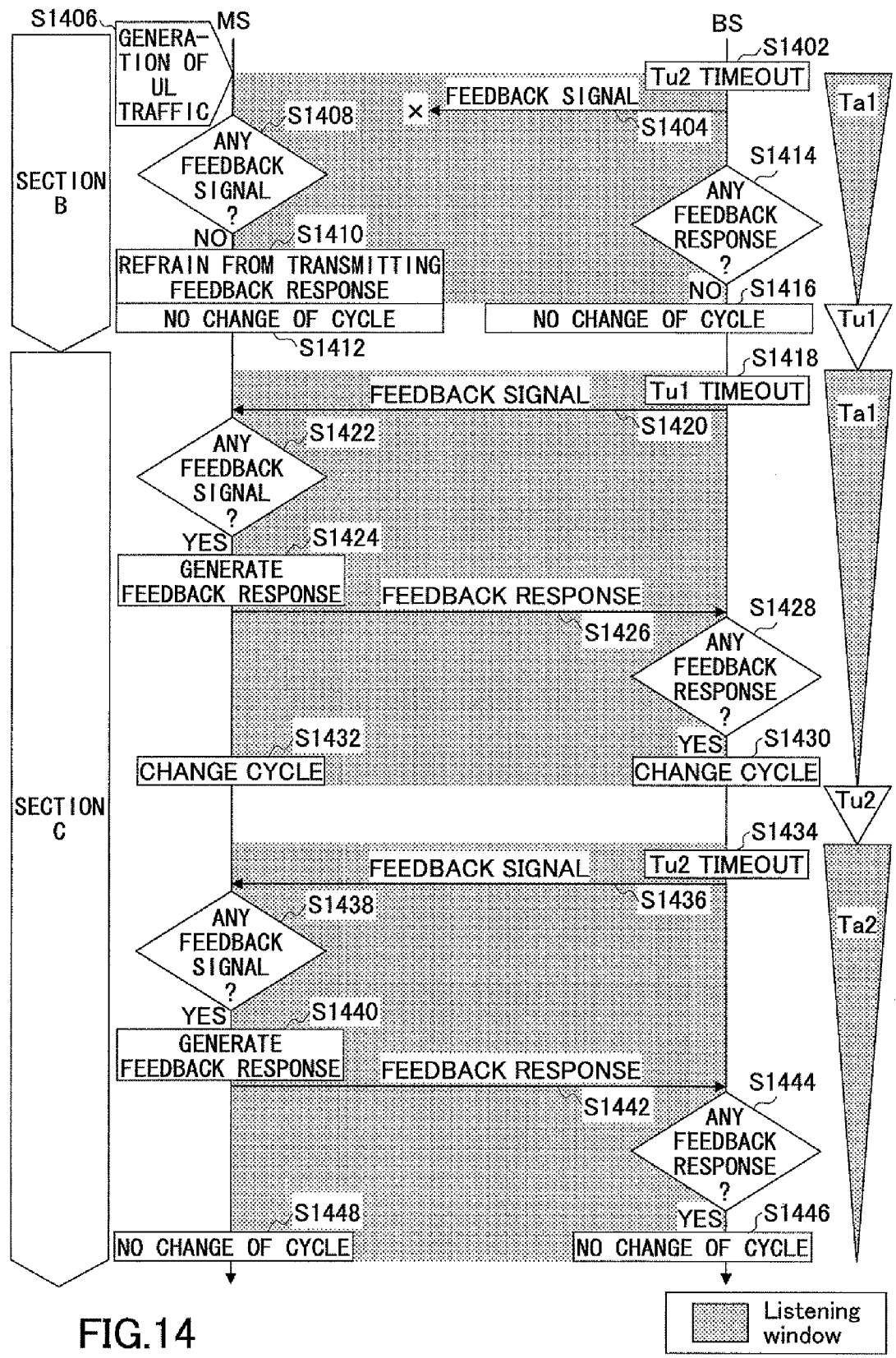
FIG. 14 is a schematic diagram for describing a flow of an operation of a communication system according to an embodiment of the present invention.

The third phase is described with reference to FIG. 14.

In the third phase, the mobile station 100 moves from section B to section C described above with reference to FIG. 4. The mobile station 100 and the base station 200 can temporarily communicate with each other when the mobile station 100 moves from section B to section C. This embodiment describes a case where there is traffic from the mobile station 100 to the base station 200 in an uplink direction.

The operation of the mobile station 100 and the base station 200 in a case where the mobile station 100 is located in section B is the same as that described above with reference to FIG. 13. That is, the processes performed in Steps S1402-S1404 and Steps S1408-S1416 are the same as those of Steps S1314-S1324. However, in this embodiment, traffic in an uplink direction is generated where the mobile station 100 is located in section B (Step S1406).

The base station 200 detects the elapse of the period Tu1 of the sleep window (Step S1418). Then, the base station 200 and the mobile station 100 start the listening window.

The base station 200 broadcasts a feedback signal (feedback message) to the mobile station 100 in the listening window (listening interval) (Step S1420).

The mobile station 100 determines whether it has received a feedback signal from the base station 200 (Step S1422). In this step, the mobile station is able to receive the feedback signal from the base station (Yes in Step S1422).

The mobile station 100 generates a feedback response to be transmitted to the base station 200 in response to the feedback signal. For example, the mobile station 100 may generate and transmit the feedback response according to the MOB_SLP-RSP described above with reference to FIG. 10. For example, the mobile station 100 may transmit a feedback channel at a frame location defined in the frame designated by the MOB_SLP-RSP message. The feedback channel may include a feedback code(s). As illustrated in FIG. 12, the feedback code may include a code transmitted when no feedback signal is received, a code transmitted when there is no uplink traffic, and a code transmitted when there is uplink traffic. In this embodiment, the feedback code includes a code transmitted when there is uplink traffic.

Then, the mobile station 100 transmits the feedback response to the base station 200 (Step S1426).

The base station 200 determines whether it has received a feedback response from the mobile station 100 (Step S1428). In this step, the base station 200 is able to receive the feedback response (Yes in Step S1428). Accordingly, the base station 200 determines that the mobile station 100 is in a condition of transmitting/receiving radio waves with the base station 200. Further, the base station 200 determines that uplink traffic is stored in the mobile station 100 according to the feedback response received from the mobile station 100.

Accordingly, the base station 200 decides to change the subsequent intermittent cycle (Step S1430). For example, the base station 200 sets the period of the initial listening window and the initial sleep window so that the listening window of the subsequent intermittent cycle can be broader. This increases the opportunity for the mobile station 100 to transmit data and enables more uplink data to be transmitted.

For example, the base station 200 may use the period Ta2 of the listening window and the period Tu2 of the sleep window which are applied to case where there is traffic and communication is possible although radio wave reception is unstable.

Then, after receiving a feedback signal from the base station 200, the mobile station 100 changes the subsequent intermittent cycle (Step S1432). For example, the mobile station 100 sets the period of the initial listening window and the initial sleep window so that the listening window of the subsequent intermittent cycle can be broader. This increases the opportunity for the mobile station 100 to transmit data and enables more uplink data to be transmitted.

For example, the mobile station 100 may use the period Ta2 of the listening window and the period Tu2 of the sleep window which are applied to case where there is traffic and communication is possible although radio wave reception is unstable.

Then, the base station 200 and the mobile station 100 start the sleep window.

Then, the base station 200 detects the elapse of the period Tu2 of the sleep window (Step S1434).

Then, the base station 200 and the mobile station 100 start the listening window.

The base station 200 broadcasts a feedback signal (feedback message) to the mobile station 100 in the listening window (listening interval) (Step S1436).

The mobile station 100 transmits the accumulated traffic as much as possible in the period Ta2 of the listening window longer than the period Ta0 of the initial listening window.

The mobile station 100 determines whether it has received a feedback signal from the base station 200 (Step S1438). In this step, the mobile station is able to receive the feedback signal from the base station (Yes in Step S1438).

The mobile station 100 generates a feedback response to be transmitted to the base station 200 in response to the feedback signal (S1440). For example, the mobile station 100 may generate and transmit the feedback response according to the MOB_SLP-RSP described above with reference to FIG. 10. For example, the mobile station 100 may transmit a feedback channel at a frame location defined in the frame designated by the MOB_SLP-RSP message. In a case where traffic, which cannot be transmitted within the time span of the current listening window, is remaining in the buffer of the mobile station 100, the mobile station 100 transmits a feedback channel including a feedback code which is transmitted when there is uplink traffic. Then, the mobile station 100 transmits the feedback response (feedback channel) to the base station 200 (Step S1442).

The base station 200 determines whether it has received a feedback response from the mobile station 100 (Step S1444). In this step, the base station 200 is able to receive the feedback response (Yes in Step S1444). The base station 200 confirms the code included in the feedback response. In a case where the confirmed code is the code transmitted when there is uplink traffic, the base station 200 does not change the current intermittent cycle (Step S1446). Since the intermittent cycle remains unchanged, the listening window having a long period can be maintained.

The mobile station 100 also does not change the intermittent cycle (Step S1448). Since the intermittent cycle remains unchanged, the listening window having a long period can be maintained.

(Fourth Phase)

Figure 15:
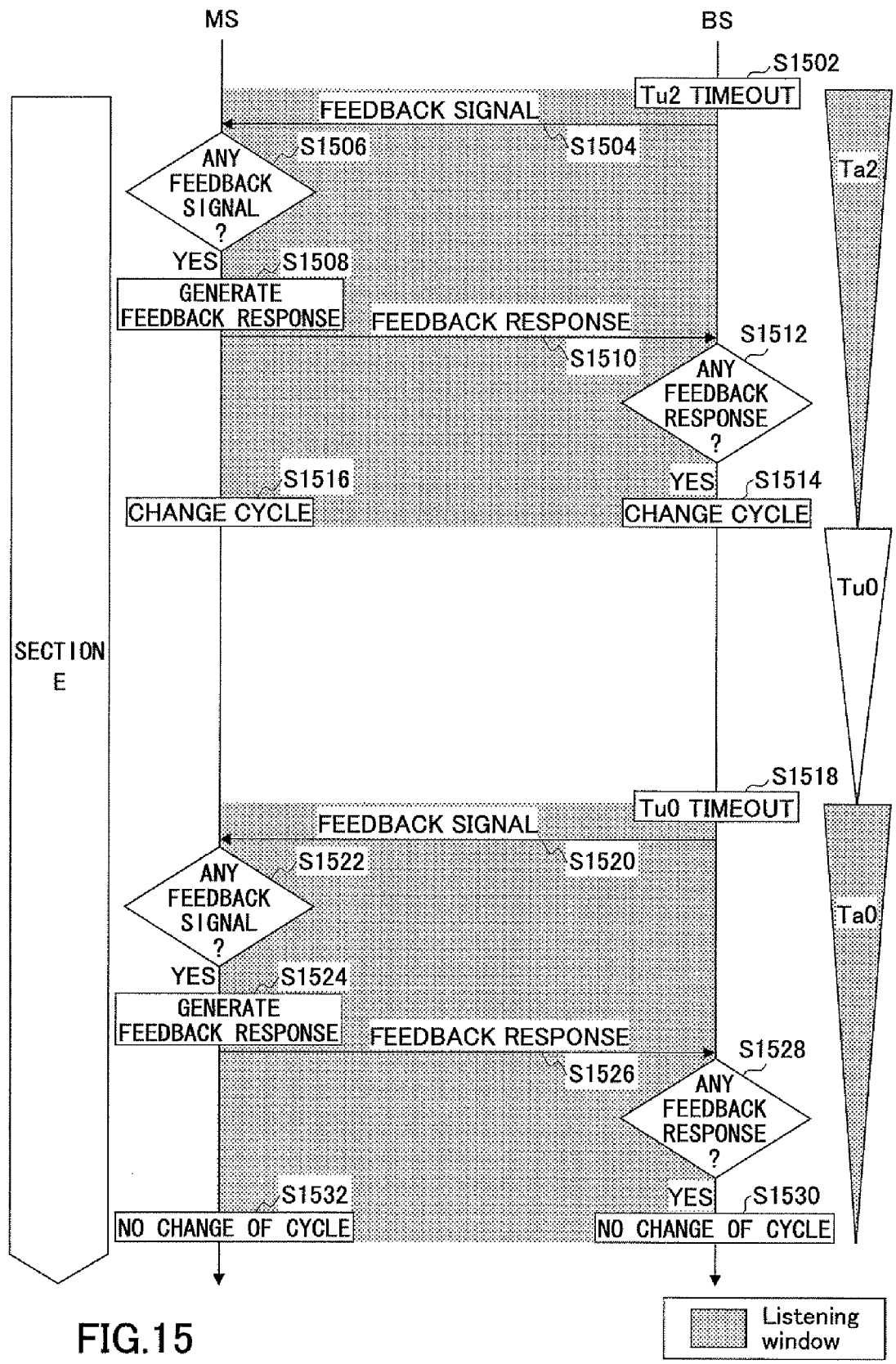
FIG. 15 is a schematic diagram for describing a flow of an operation of a communication system according to an embodiment of the present invention.

The fourth phase is described with reference to FIG. 15.

In the fourth phase, the mobile station 100 moves to section E (described above with reference to FIG. 4). In section E, the mobile station 100 and the base station 200 can stably communicate with each other. This embodiment describes a case where the mobile station 100 has no uplink traffic to be transmitted to the base station 200.

Then, the base station 200 and the mobile station 100 start the listening window when the period Tu2 of the sleep window of the communication condition "radio wave unstable communication possible" elapses (Step S1502). The base station 200 activates the timer. The timer measures the period Ta2 of the listening window.

The base station 200 broadcasts the feedback signal (feedback message) to the mobile station 100 in the listening window (listening interval) (Step S1504).

Then, the mobile station 100 determines whether it has received a feedback signal from the base station 200 (Step S1506). Since the mobile station 100 is able to receive the feedback signal transmitted from the base station 200 (Yes in Step S1506), the mobile station 100 generates a feedback response (S1508) in response to the received feedback signal. Then, the mobile station 100 transmits the feedback response to the base station (Step S1510). Since no uplink traffic accumulated in the buffer of the mobile station 100 has been transmitted, the feedback response includes a code indicating no there is no uplink traffic (0b0010).

The base station 200 determines whether it has received a feedback response from the mobile station 100 (Step S1512). In this step, the base station 200 is able to receive the feedback response (Yes in Step S1512). The base station 200 confirms the code included in the feedback response. In a case where the confirmed code is the code transmitted when there is no uplink traffic, the base station 200 determines that the mobile station 100 is located in an area where radio wave reception is stable. The base station 200 may also determine that the mobile station 100 is located in an area where radio wave reception is stable according to the number of times receiving the feedback response including the code indicating that there is no uplink traffic.

In a case where the base station 200 determines that the mobile station 100 is located in an area where radio wave reception is stable, the base station 200 changes the intermittent cycle (Step S1514). For example, the base station 200 may return the intermittent cycle to its initial intermittent cycle. The initial intermittent cycle includes a listening window having a period Ta0 and a sleep window having a period Tu0.

Likewise, the mobile station 200 may return the intermittent cycle to its initial intermittent cycle in a case where the feedback response including the code indicating no uplink traffic is transmitted for a predetermined threshold consecutive number of times N (N being an integer, N>0) (Step S1516). The threshold N may be the number of times of determining that there is no uplink traffic.

Then, the base station 200 and the mobile station 100 start the sleep window.

The base station 200 detects the elapse of the period Tu0 of the sleep window (Step S1518).

Then, the base station 200 and the mobile station 100 start the listening window.

The base station 200 broadcasts a feedback signal (feedback message) to the mobile station 100 in the listening window (listening interval) (Step S1520).

The mobile station 100 determines whether it has received a feedback signal from the base station 200 (Step S1522). In this step, the mobile station is able to receive the feedback signal from the base station (Yes in Step S1522).

The mobile station 100 generates a feedback response to be transmitted to the base station 200 in response to the feedback signal (Step S1524). For example, the mobile station 100 may generate and transmit the feedback response according to the MOB_SLP-RSP described above with reference to FIG. 10. For example, the mobile station 100 may transmit a feedback channel at a frame location defined in the frame designated by the MOB_SLP-RSP message. The feedback channel may include a feedback code which is transmitted when there is no uplink traffic.

Then, the mobile station 100 transmits the feedback response to the base station 200 (Step S1526).

The base station 200 determines whether it has received a feedback response from the mobile station 100 (Step S1528). In this step, the base station 200 is able to receive the feedback response (Yes in Step S1528). The base station 200 confirms the code included in the feedback response. Since the code is the code transmitted when there is no uplink traffic, the base station 200 does not change the intermittent cycle (Step S1530).

The mobile station 100 also does not change the intermittent cycle (Step S1532).

Whenever the mobile station 100 becomes unable to receive feedback signals from the base station 200 again during the listening window, the base station 200 and the mobile station 100 may start the above-described second phase.

Hence, with the above-described embodiments of the present invention, the communication-able period of the intermittent cycle can be shortened in a case where the radio wave reception condition is unstable and communication cannot be performed whereas the communication-able period of the intermittent cycle can be extended in a case where the radio wave reception condition is stable.

Further, with the above-described embodiments of the present invention, the period corresponding to the listening window can be extended in a case where there is uplink traffic. Thereby, a mobile station and/or a base station, having data accumulated in its buffer, can promptly transmit the data. Accordingly, the amount of buffer of the mobile station and/or the base station can be reduced. Further, with the above-described embodiments of the present invention, the opportunities in performing communications can be improved while maintaining low power consumption.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
    a deciding part configured to decide a period of performing data transmission/reception and a period of not performing data transmission/reception when performing intermittent communications;
    a generating part configured to generate a predetermined signal to a mobile station; and
    an adjusting part configured to extend or shorten the period of performing data transmission/reception and/or the period of not performing data transmission/reception according to a response signal transmitted from the mobile station in response to the predetermined signal.

2. The base station as claimed in claim 1, wherein the adjusting part is configured to adjust the period of performing data transmission/reception and/or the period of not performing data transmission/reception in a case where no response is received from the mobile station in response to the predetermined signal.

3. The base station as claimed in claim 1, wherein the predetermined signal includes information indicating existence of data with respect to the mobile station.

4. The base station as claimed in claim 1, wherein the response includes information indicating existence of data with respect to the base station, wherein the adjusting part is configured to extend the period of performing data transmission/reception in a case where the response includes information indicating that data with respect to the base station exists.

5. The base station as claimed in claim 1, wherein the adjusting part is configured to extend the period of performing data transmission/reception according to existence of data destined for the mobile station.

6. The base station as claimed in claim 1, wherein the adjusting part is configured to adjust the period of performing data transmission/reception and the period of not performing data transmission/reception in a case where transmission of data destined for the mobile station is terminated.

7. The base station as claimed in claim 1, wherein the adjusting part is configured to adjust the period of performing data transmission/reception and the period of not performing data transmission/reception depending on whether the base station can communicate with the mobile station in a case where radio wave conditions between the mobile station are unstable.

8. The base station as claimed in claim 1, wherein the adjusting part is configured to adjust the period of performing data transmission/reception and the period of not performing data transmission/reception according to existence of data destined for the mobile station in a case where the base station can communicate with the mobile station while radio wave conditions with the mobile station are unstable.

9. The base station as claimed in claim 1, wherein the adjusting part is configured to adjust a combined period having both the period of performing data transmission/reception and the period of not performing data transmission/reception.

10. A mobile station comprising:
    a deciding part configured to decide a period of performing data transmission/reception and a period of not performing data transmission/reception when performing intermittent communications;
    a generating part configured to generate a response signal in response to a signal transmitted from a base station for confirming whether the intermittent communications can be performed; and
    an adjusting part configured to extend or shorten the period of performing data transmission/reception and/or the period of not performing data transmission/reception.

11. The mobile station as claimed in claim 10, further comprising a determining part configured to determine whether the mobile station can communicate with the base station;
   wherein the generating part is configured to generate the response signal when the determining part determines that the mobile station can communicate with the base station.

12. The mobile station as claimed in claim 11, wherein the determining part determines whether the mobile station can communicate with the base station according to the strength of radio waves transmitted from the base station.

13. A method comprising:
   determining a period of performing data transmission/reception and a period of not performing data transmission/reception in a case of performing intermittent communications between a base station and a mobile station;
   generating a predetermined signal at the base station;
   transmitting the predetermined signal from the base station to the mobile station;
   generating a response signal in response to the predetermined signal at the mobile station; and
   extending or shortening the period of performing data transmission/reception and the period of not performing data transmission/reception according to the response signal generated in response to the predetermined signal.

* * * * *